US012562171B1

(12) United States Patent (10) Patent No.: US 12,562,171 B1
Kockerbeck et al. (45) Date of Patent: Feb. 24, 2026

(54) CONTENT PERSONALIZATION METRICS

(71) Applicant: Amazon Technologies, Inc., Seattle, WA (US)

(72) Inventors: Mark Conrad Kockerbeck, Laguna Niguel, CA (US); Jaber Jaber, Corona, CA (US); Manish Dutt Sharma, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 452 days.

(21) Appl. No.: 17/955,860

(22) Filed: Sep. 29, 2022

(51) Int. Cl.
| | |
|---|---|
| *G10L 17/22* | (2013.01) |
| *G06F 16/901* | (2019.01) |
| *G10L 13/02* | (2013.01) |
| *G10L 17/04* | (2013.01) |

(52) U.S. Cl.
CPC .......... *G10L 17/22* (2013.01); *G06F 16/9014* (2019.01); *G10L 13/02* (2013.01); *G10L 17/04* (2013.01)

(58) Field of Classification Search
CPC ......... G10L 17/22; G10L 13/02; G10L 17/04; G06F 16/9014
See application file for complete search history.

(56) References Cited

U.S. PATENT DOCUMENTS

| | | | | |
|---|---|---|---|---|
| 2004/0181687 | A1* | 9/2004 | Nachenberg .......... | G06F 21/567 |
| | | | | 713/176 |
| 2010/0212016 | A1* | 8/2010 | Dubhashi ................ | H04L 63/10 |
| | | | | 726/26 |
| 2011/0061069 | A1* | 3/2011 | Arte .................... | H04N 21/4826 |
| | | | | 725/87 |
| 2011/0289534 | A1* | 11/2011 | Jordan ............... | H04N 21/4668 |
| | | | | 725/48 |
| 2013/0060648 | A1* | 3/2013 | Maskatia ......... | H04N 21/25875 |
| | | | | 705/16 |
| 2016/0154887 | A1* | 6/2016 | Zhao .................... | G06F 16/4387 |
| | | | | 707/723 |
| 2016/0274744 | A1* | 9/2016 | Neumann ........ | H04N 21/47202 |
| 2017/0339434 | A1* | 11/2017 | Watson .............. | H04N 21/4756 |
| 2022/0067087 | A1* | 3/2022 | Reardon .............. | G06F 16/638 |

* cited by examiner

*Primary Examiner* — Sonia L Gay
(74) *Attorney, Agent, or Firm* — Pierce Atwood LLP

(57) ABSTRACT
Techniques for determining a level of personalization for content presented to users are described. A system may determine the level of personalization based on the number of users that receive the same content within a given time period, where if a large number of users receive the same content than the output is not personalized. The personalization level can be used to determine whether more or less personalized content is to be provided to a user, which may be on a domain-basis, user feedback basis, etc. The personalization level can also be used to prompt the user to configure certain settings which can help increase or decrease the amount of personalized content the user receives.

18 Claims, 13 Drawing Sheets

FIG. 1B

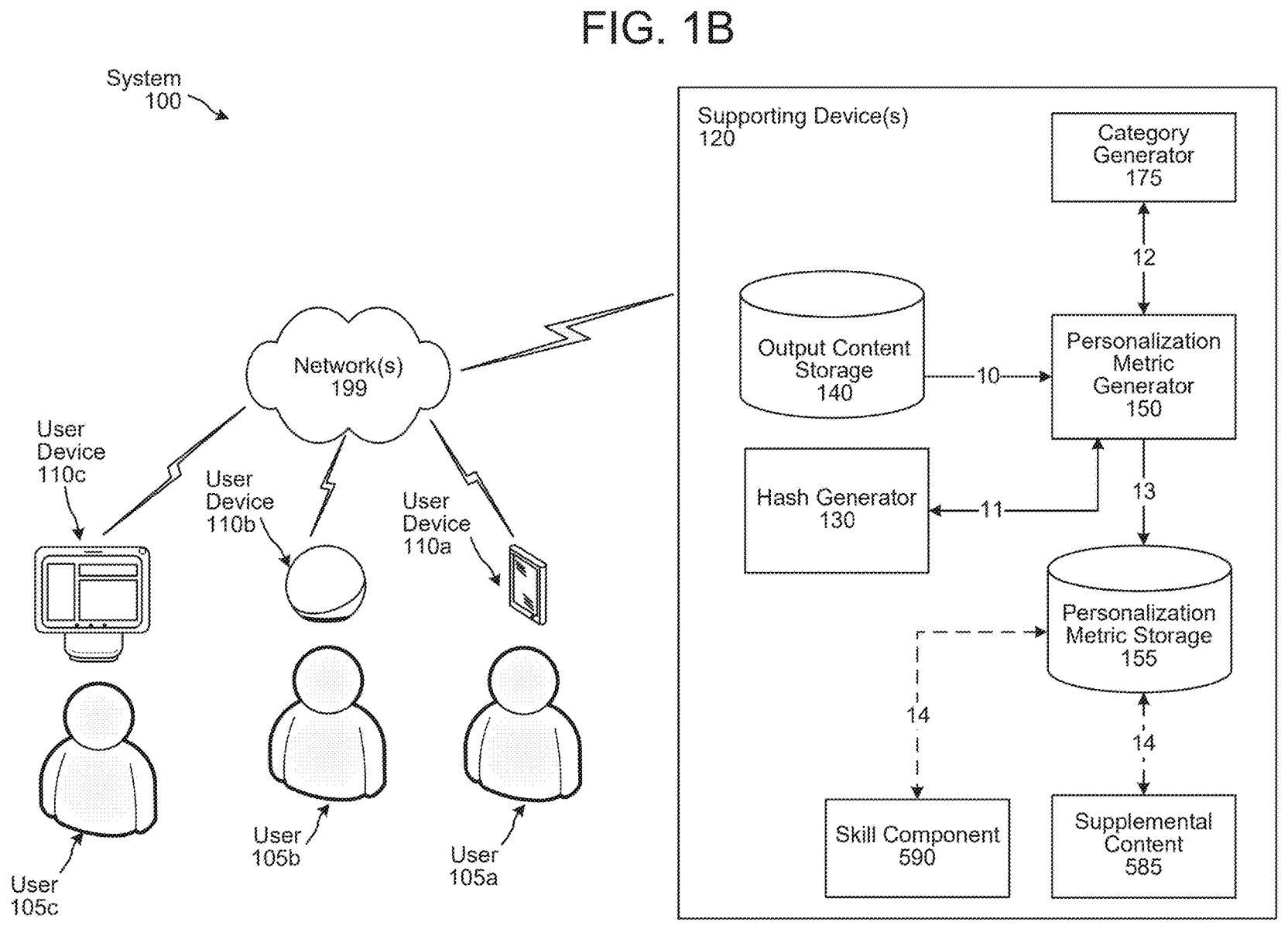

Supporting Device(s) 120

Category Generator 175

Personalization Metric Generator 150

Personalization Metric Storage 155

Supplemental Content 585

Output Content Storage 140

Hash Generator 130

Skill Component 590

12

13

14

10

11

14

System 100

Network(s) 199

User Device 110a

User 105a

User Device 110b

User 105b

User Device 110c

User 105c

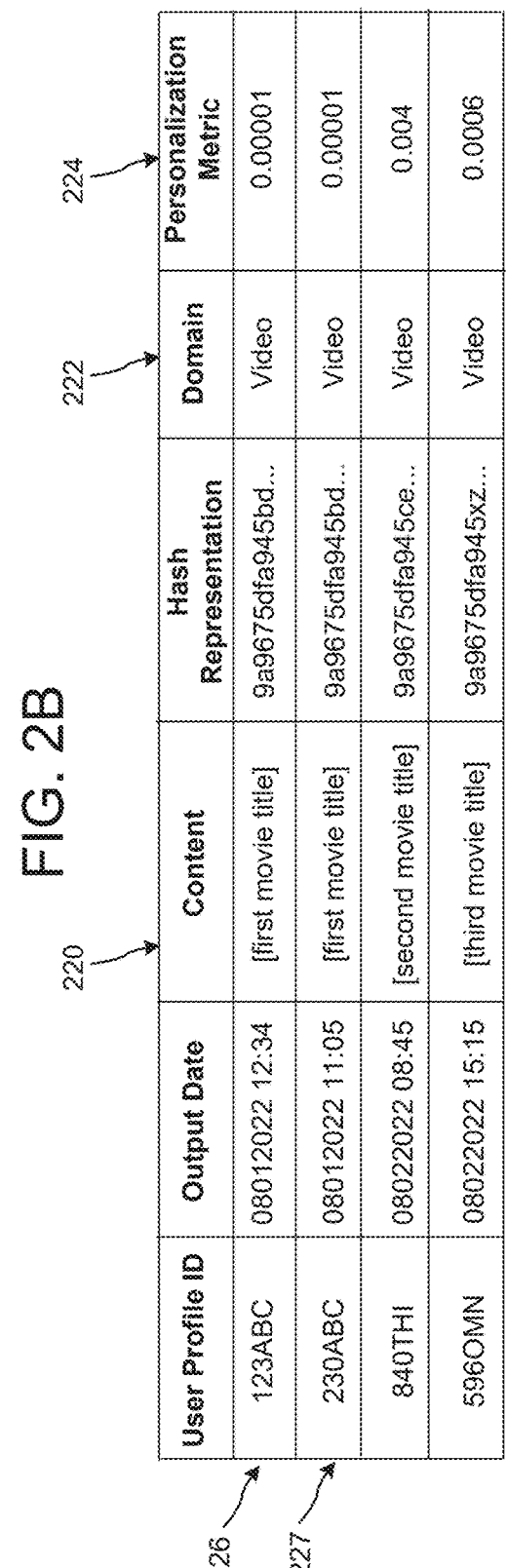

| User Profile ID | Output Date | Content | Hash Representation | Domain | Personalization Metric |
|---|---|---|---|---|---|
| 123ABC | 08012022 12:34 | [first movie title] | 9a9675dfa945bd... | Video | 0.00001 |
| 123ABC | 08022022 11:22 | [second movie title] | 9a9675dfa945ct... | Video | 0.000002 |
| 123ABC | 08022022 20:41 | [third movie title] | 9a9675dfa945op... | Video | 0.0005 |
| 123ABC | 08052022 18:45 | [fourth movie title] | 9a9675dfa945ce... | Video | 0.004 |
| 123ABC | 08072022 15:15 | [fifth movie title] | 9a9675dfa945xz... | Video | 0.0006 |

| User Profile ID | Output Date | Content | Hash Representation | Domain | Personalization Metric |
|---|---|---|---|---|---|
| 123ABC | 08012022 12:34 | [first movie title] | 9a9675dfa945bd... | Video | 0.00001 |
| 230ABC | 08012022 11:05 | [first movie title] | 9a9675dfa945bd... | Video | 0.00001 |
| 840THI | 08022022 08:45 | [second movie title] | 9a9675dfa945ce... | Video | 0.004 |
| 596OMN | 08022022 15:15 | [third movie title] | 9a9675dfa945xz... | Video | 0.0006 |

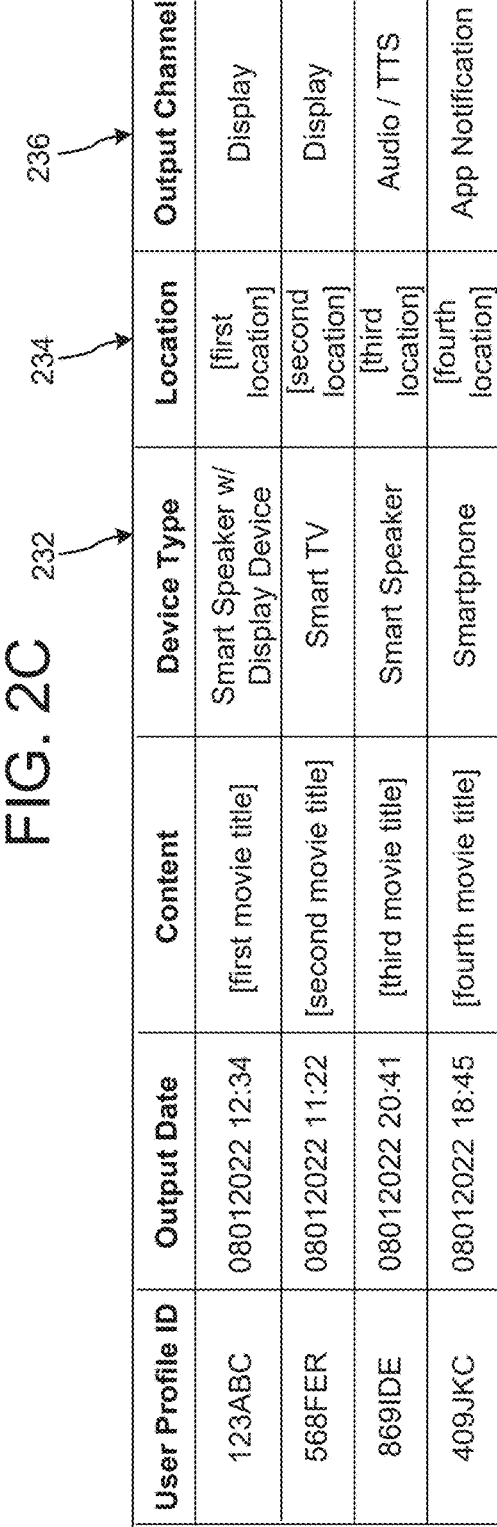

| User Profile ID | Output Date | Content | Device Type | Location | Output Channel |
|---|---|---|---|---|---|
| 123ABC | 08012022 12:34 | [first movie title] | Smart Speaker w/ Display Device | [first location] | Display |
| 568FER | 08012022 11:22 | [second movie title] | Smart TV | [second location] | Display |
| 869IDE | 08012022 20:41 | [third movie title] | Smart Speaker | [third location] | Audio / TTS |
| 409JKC | 08012022 18:45 | [fourth movie title] | Smartphone | [fourth location] | App Notification |

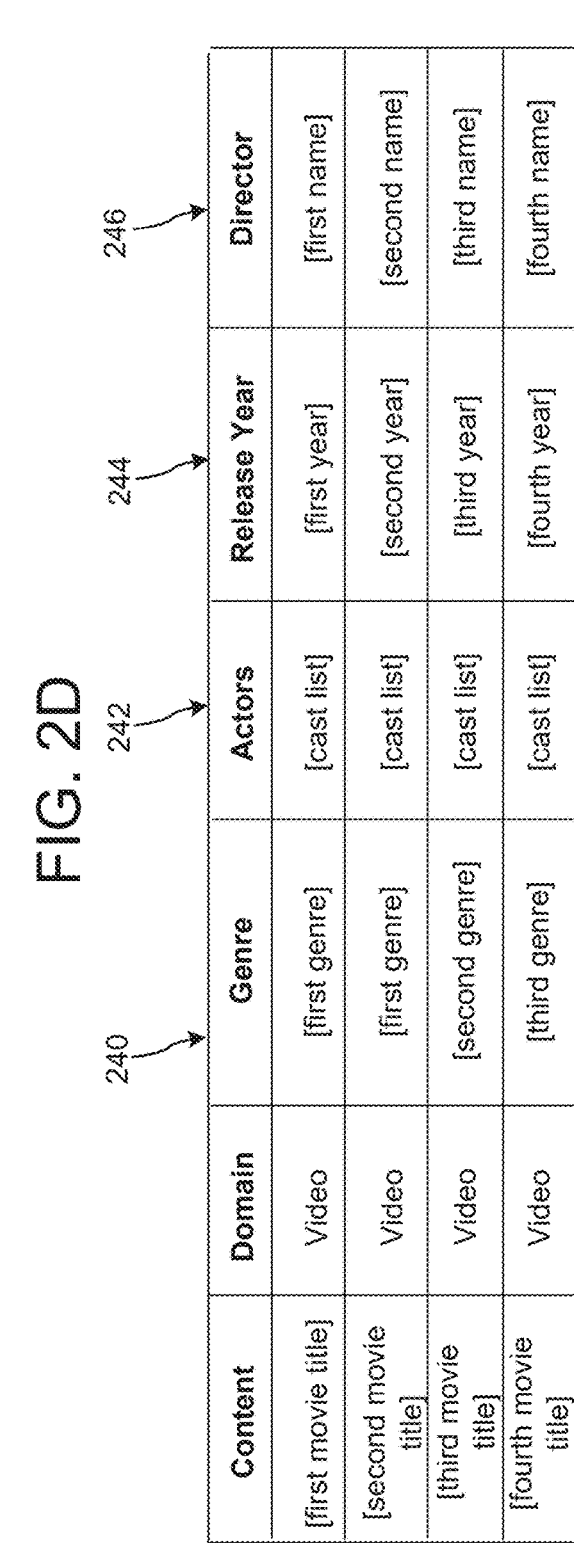

| Content | Domain | Genre | Actors | Release Year | Director |
|---|---|---|---|---|---|
| [first movie title] | Video | [first genre] | [cast list] | [first year] | [first name] |
| [second movie title] | Video | [first genre] | [cast list] | [second year] | [second name] |
| [third movie title] | Video | [second genre] | [cast list] | [third year] | [third name] |
| [fourth movie title] | Video | [third genre] | [cast list] | [fourth year] | [fourth name] |

Figure 7:
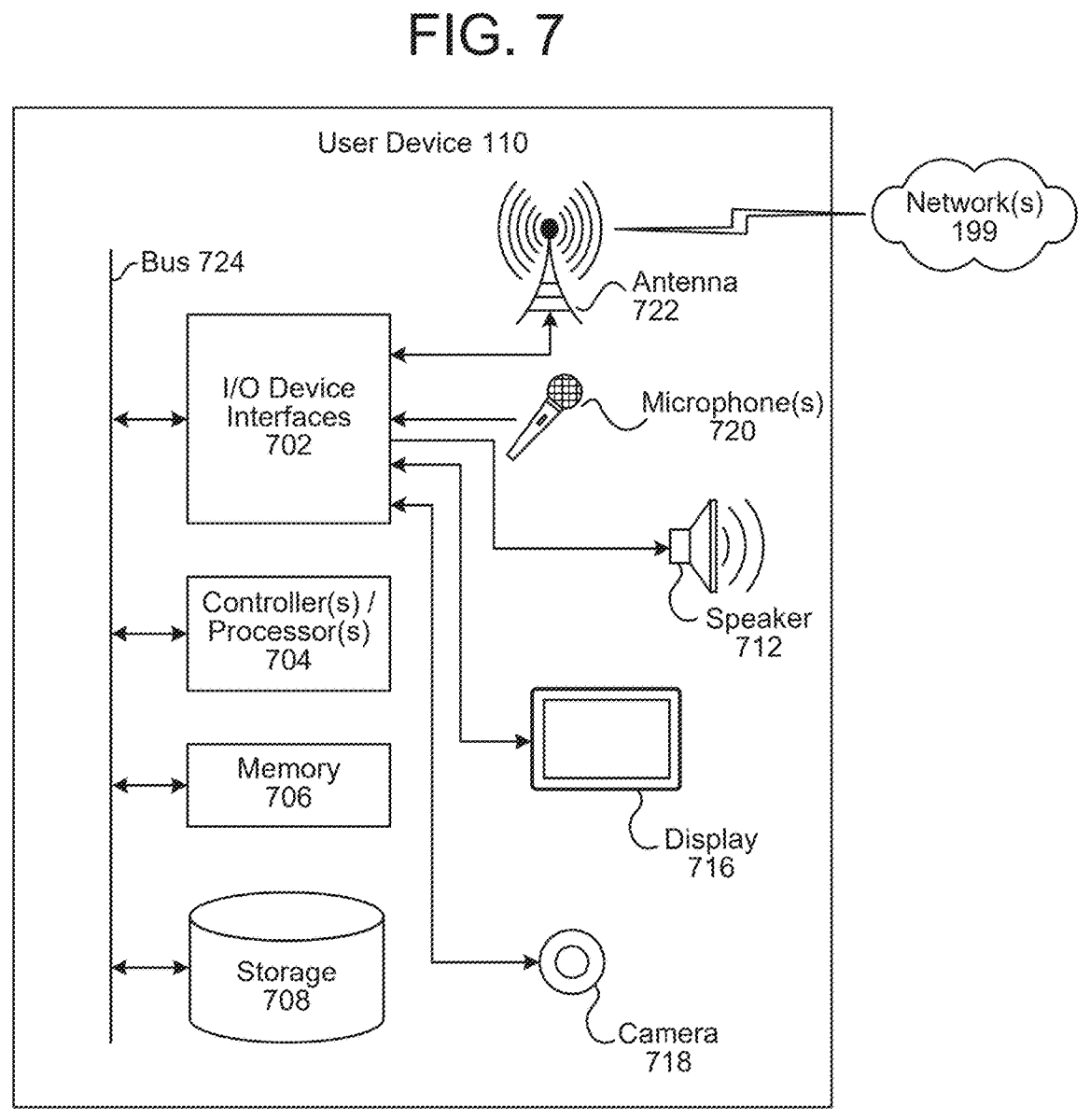

Network(s) 199

User Device 110

Bus 724

Antenna 722

Microphone(s) 720

Speaker 712

Display 716

Camera 718

I/O Device Interfaces 702

Controller(s) / Processor(s) 704

Memory 706

Storage 708

FIG. 8

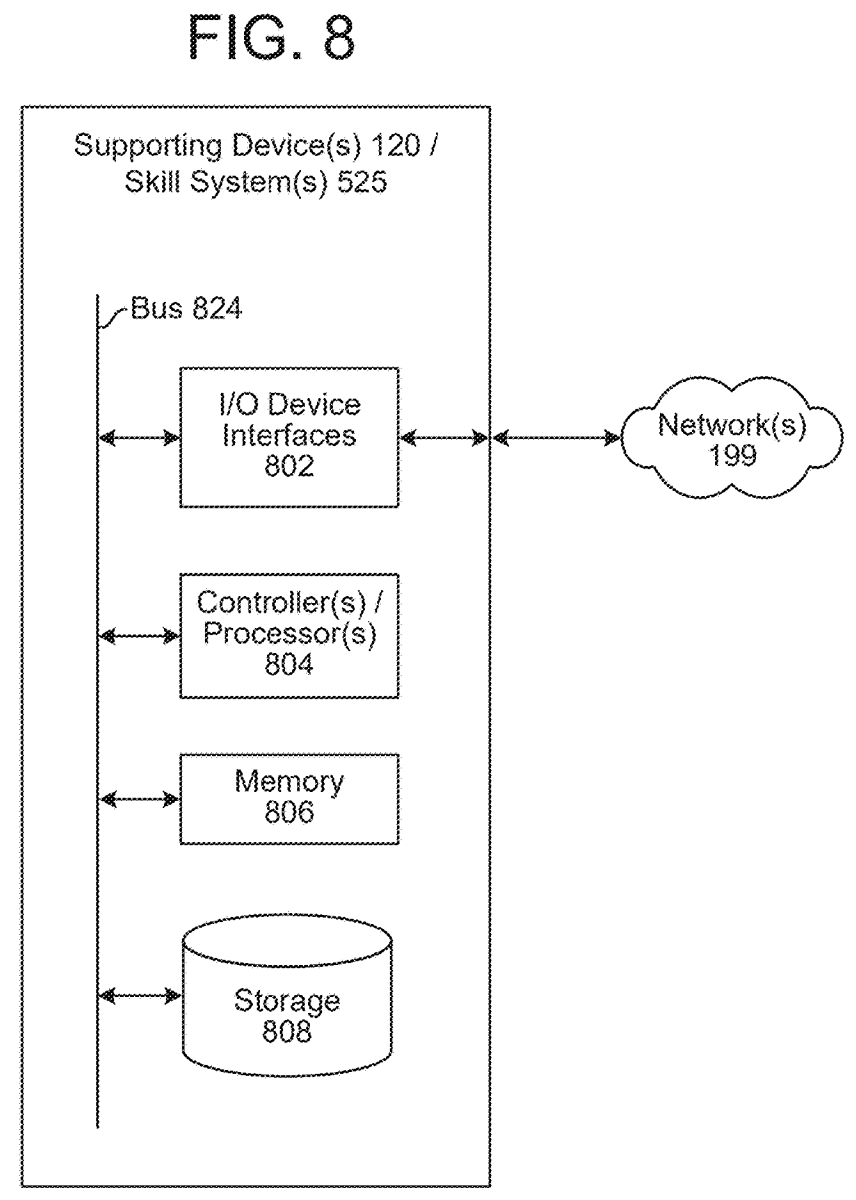

Supporting Device(s) 120 / Skill System(s) 525

Network(s) 199

Bus 824

I/O Device Interfaces 802

Controller(s) / Processor(s) 804

Memory 806

Storage 808

CONTENT PERSONALIZATION METRICS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B is a conceptual diagram illustrating a system for determining a personalization metric for a system aspect, according to embodiments of the present disclosure.

FIGS. 2A-2D show example data that may be determined and/or used by a system, according to embodiments of the present disclosure.

FIG. 3B is a system component flow diagram illustrating user recognition according to embodiments of the present disclosure.

FIG. 7 is a block diagram conceptually illustrating example components of a device, according to embodiments of the present disclosure.

FIG. 8 is a block diagram conceptually illustrating example components of a system, according to embodiments of the present disclosure.

DETAILED DESCRIPTION

Figure 1A:
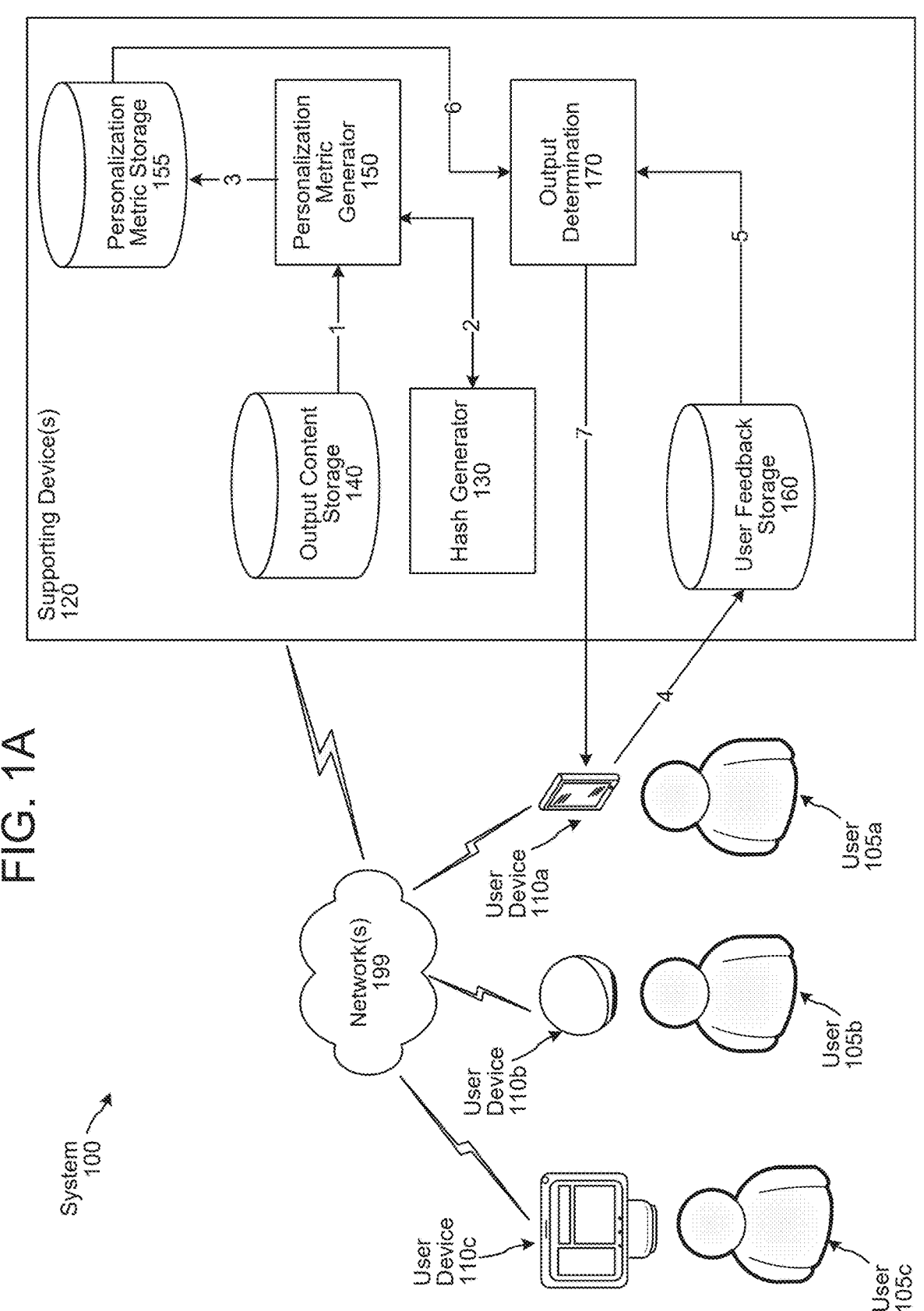
FIG. 1A is a conceptual diagram illustrating a system for determining a personalization metric for a user and determining an output based on the personalization metric and user feedback, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. Natural language generation (NLG) can also be used to generate human-understandable outputs representing machine representations of information. The NLG outputs can be shared with human users as synthesized speech (generated using TTS), displayed text, or other ways of communicating natural language content to a user. ASR, NLU, NLG, and TTS may be used together as part of a speech-processing/virtual assistant system.

Certain systems may be configured to perform actions responsive to user inputs. For example, for the user input of "Alexa, play music by [artist]," a system may output music sung by the indicated artist. For further example, for the user input of "What is the weather," a system may output synthesized speech representing weather information for a geographic location of the user. In a further example, for the user input of "Alexa, send a message to John," a system may capture spoken message content and cause same to be output via a device registered to "John."

In certain cases, a system may proactively generate and output content to a user. Such content may not be in response to a user input received by the system, and may be referred to as "supplemental content." In some cases, the supplemental content may be output in addition to, or otherwise supplement, an output that is responsive to a user input. In other cases, the supplemental content may be presented without the system receiving a user input, for example, as displayed content on a device screen while the device is not actively in use. As used herein, "content" refers to synthesized speech, displayed text, an image(s), a video(s), a displayed graphical user interface (GUI) element(s), or the like that is output via a device and perceivable by a user.

In some cases, the system may output supplemental content after performing a requested action. For example, after a system books a flight requested by a user, the system may output a response to the user input indicating the flight has been booked, and then the system may output supplemental content indicating weather information for an arrival location of the flight (or querying the user as to whether the user wants the weather information output). As a further example, after the system finishes playback of a song requested by the user, the system may output supplemental content indicating other songs and/or artists the user may be interested in (or querying the user as to whether the user would like to receive information about songs and/or artists the user may be interested in). As another example, after a skill component performs an action requested by a user, the system may output supplemental content indicating another skill component, a related skill component functionality, etc. that may be of interest to the user.

In other cases, the system may output supplemental content in a manner that is not in conjunction with output of a response to a user input. For example, a device screen may display one or more graphical elements (such as those sometimes referred to as "cards") including content such as movie titles that may be of interest to a user. A user may perform a swipe action with respect to the display to cause the display to present one or more other cards, may select a card to interact with the presented content, may perform an action with respect to the display to dismiss a card (i.e., cause that particular card to no longer be displayed), etc.

The system may include and/or communicate with one or more content sources, which may provide content corresponding to one or more domains. For example, video content like "Watch [movie]" may be sourced from a movie catalog, while recently-played-music content like "Continue listening to [song]" may be sourced from a music service provider's application program interface (API).

As used herein, a "domain" may correspond to a group of skill or other components that perform related or similar functionalities. For example, a music domain may include one or more music skill components that can respond to a user's natural language request to play music, enable a user to purchase music, etc. In another example, a smart-home domain may include one or more skill components that enable a user to control various home devices by voice user interface, graphical user interface, presence-based interface (e.g., motion detectors), etc.

Certain content presented to a user (requested content or supplemental content) may be personalized for a user profile or user account based on, for example, user preferences, past user-system interactions, trending topics, contextual information, etc. Whereas other content may be presented generally to a number of users, and may not be personalized for a particular user (or group of users) as such. A user profile may correspond to an individual user. A user account may be associated with multiple user profiles. For example, a user account for a household may be associated with user profiles of the individual household members. Further, a user profile may be associated with more than one user device.

The present disclosure relates to techniques for quantifying whether presented content is personalized or non-personalized. The techniques involve determining a personalization metric representing a level of personalization for content outputted to user profiles. In some embodiments, a personalization metric can be determined for a user profile based on pieces of content presented to the user during a time period and how many other user profiles received the same pieces of content during that time period. In some embodiments, a personalization metric is determined for a domain (e.g., a video domain, a music domain, a weather domain, a smart home domain, a news domain, etc.) based on how many user profiles received the same pieces of content, corresponding to the domain, during a given time period. Other embodiments involve determining a personalization metric for a content category (e.g., movie genre, actor, music genre, artist, etc.) of a domain, an output modality (e.g., displayed content, synthesized speech, notifications, etc.), or other aspects of a system.

In some cases, content may be considered as personalized when data specific to a user profile or a user account is used to determine the content for presentation to a user, and content may be considered as non-personalized when such specific data is not used in determining the content. Such specific data may be stored in a user profile or user account, may be provided as preferences by a user, may be derived from other sources, etc. Content may be personalized based on geographic locations of users, type of user devices associated with users, preferences for particular entities, past interaction data, purchase history, etc.

The present disclosure also relates to techniques for increasing or decreasing presentation of personalized content based on various factors. In some embodiments, based on user feedback indicating that a user wants to receive more personalized content, the system can present personalized content for an aspect (e.g., a domain, a content category, an output modality, etc.) that the user may be receiving non-personalized content for. For example, the system may determine a personalization metric for content presented to the user profile and corresponding to a domain, may determine that the personalization metric indicates the user profile is receiving non-personalized content for the domain, and may cause personalized content to be presented in the future for the domain. On the other hand, the system can present non-personalized content based on user feedback indicating that a user wants to receive less (or no) personalized content for a particular aspect of the system.

In some embodiments, the system can prompt a user to provide information that can be used to determine personalized content, such as the user's preferences, topics, items or things of interest to the user, etc. In some embodiments, the system can select an output for presenting content based on a personalization metric corresponding to the output modality.

In some embodiments, a user may request a personalization metric from the system, and the system may determine and present the requested personalization metric.

In some embodiments, the system may use a personalization metric as a historical measure to understand how personalized past content was, and may predict how personalized subsequently presented (future) content will be. In some embodiments, the system may aim to increase engagement between the user and the system, for example, by presenting personalized content to the user and the user interacting with it because it is of interest to the user. The system may use the personalization metrics to identify user preferences.

Some embodiments involve determining a personalization metric using hash representations of the presented content. This helps in maintaining privacy, where the personalization metric is determined without knowledge of the specific content that is presented to the users.

The techniques described herein provide, among other things, ways to quantify personalized outputs presented to user profiles of a system, so that the system can adjust (increase or decrease) output of personalized content, thereby improving the user experience.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram illustrating a system for determining a personalization metric for a user profile (or user account) and determining an output based on the personalization metric and user feedback, according to embodiments of the present disclosure. As shown in FIG. 1A, the system 100 may include one or more user devices 110a, 110b, 110c, local to respective individual users 105a, 105b, 105c. The user devices 110 may be connected to a supporting device(s) 120 across one or more networks 199.

Figure 5:
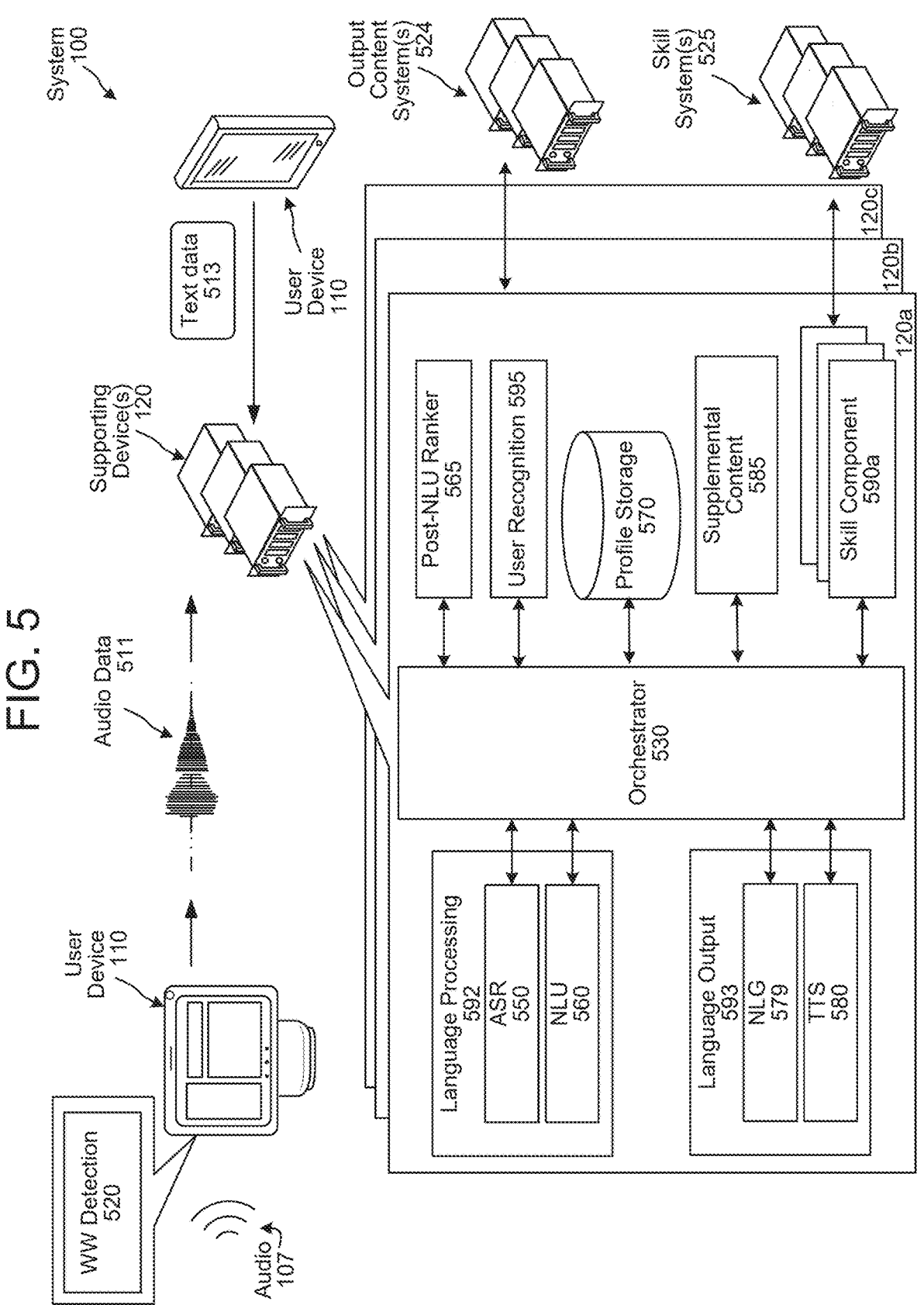
FIG. 5 is a conceptual diagram of components of the system, according to embodiments of the present disclosure.

In some embodiments, the supporting device(s) 120 may be a virtual assistant system, and may include one or more components shown in and described in relation to FIG. 5. The user device 110 may be enabled to capture user inputs, which may be spoken inputs, typed inputs, selection of user interface elements, selection of physical device buttons, gesture inputs (captured as image data), etc. The user device 110 may be configured to present content to the user 105, where such content may be presented via a device screen as displayed content including one or more images, one or more graphics, text, etc. Additionally or alternatively, the content may be presented as audio including synthesized speech. In some embodiments, the content may be presented as a notification via a message (e.g., email message, text message, push notification, application notification, etc.). The content may be presented in response to receiving a user input from the user 105 and the device 110 (and optionally the supporting device(s) 120) processing the user input. In other cases, the content may be presented as supplemental content that may not be responsive to a user input. Although the figures and discussion of the present disclosure illustrate certain steps in a particular order, the steps described may be performed in a different order (as well as certain steps removed or added) without departing from the present disclosure.

The supporting device(s) 120 may include an output content storage 140 that may store data corresponding to content that has been presented to the user profiles/user accounts of the users 105 via the user devices 110. The output content storage 140 may store information that may be used to identify the content (e.g., a content name, a link to access the content, or some other unique content identifier) corresponding to the content. For example, in the case where the content is music, the output content storage 140 may store a song identifier, a song name, an artist name, and/or an album name corresponding to the music. In a further example where the content is a movie, the output content storage 140 may store a movie identifier, a movie name, a release year, and/or one or more actor names corresponding to the movie. In yet a further example where the content is product information, the output content storage 140 may store a product identifier, a product name, and/or a manufacturer name corresponding to the product.

In some embodiments, the output content storage 140 may store data identifying the user 105 (e.g., a user profile identifier) to whom the content is presented. In some embodiments, the output content storage 140 may store data identifying the user device 110 (e.g., a device identifier, a device type, etc.) via which the content is presented.

In some embodiments, the output content storage 140 may store data identifying a content source corresponding to the presented content. For example, in the case of the content being music, the output content storage 140 may store an identifier for a music service provider or a music skill component.

In some embodiments, the output content storage 140 may store data identifying a domain corresponding to the presented content.

In some embodiments, the output content storage 140 may store time information (e.g., a timestamp, a date, a timestamp and date, etc.) representing when the content was sent to a user device 110 for presentation. In some cases, the user device 110 may receive content, from the supporting device(s) 120 for example, for presentation, but may not output it until a later time (e.g., when the user 105 "wakes up" the user device 110, when the user 105 provides a user input to the user device 110, etc.). Thus, in some embodiments the output content storage 140 may store time information representing when the content is presented/outputted by a user device 110 for presentation in addition to or instead of when the content was sent to the user device 110.

The supporting device(s) 120 may include a personalization metric generator 150 that may be configured to determine personalization metrics representing a level of personalization for user profiles with respect to content presented to users 105. In the example embodiment shown in FIG. 1A, the personalization metric generator 150 may receive (step 1) data corresponding to content presented via user profiles of the users 105 (which may be a subset of users of the system 100, almost all users of the system 100, a group of users that may be determined based on some factors, etc.). The personalization metric generator 150 may request (or retrieve) such data from the output content storage 140, and in some embodiments, may request data corresponding to a particular time period (e.g., last 24 hours, last 48 hours, last week, last month, last quarter, last year, etc.). The personalization metric generator 150 may use the received data to determine a personalization metric for individual user profiles (or user accounts) of the users 105. In the example embodiment shown in FIG. 1A, the personalization metric generator 150 may determine a personalization metric for a user profile of the user 105a based on content presented to the user 105a as compared to at least one other user profile, for example, at least ones for other users 105b and 105c. The system 100 may determine that content is presented to a user 105 based on the content being sent to a user device(s) 110 associated with a user profile or user account of the user 105. In some embodiments, the personalization metric may be based on a number of user devices 110 that received the content for output.

To determine the personalization metric, the personalization metric generator 150 may first determine hash representations of the content. The personalization metric generator 150 may use (step 2) a hash generator 130 to do so. In other embodiments, other types of representations of the content may be determined. The hash generator 130 may be configured to generate a MD5 hash representation of content presented to the users 105. In other embodiments, the hash generator 130 may be configured to generate other types of hash representations. Such hash representations may be generated using content in the form of text and/or images. The personalization metric generator 150 may send text data and/or image data representing the content to the hash generator 130, where the text/image data may be included in the data received from the output content storage 140. For example, when the content is presented as synthesized speech, the personalization metric generator 150 may send text data, used to generate the synthesized speech, to the hash generator 130. As another example, when the content is presented via a display card, the personalization metric generator 150 may send image data and text data (if any), included in the display card, to the hash generator 130. In other embodiments, the hash representation may be based on the content, a device type identifier (for the user device 110 that presented the content), an output modality identifier (for the output modality that was used to present the content), a time period identifier (during which the content was sent to user devices 110), and/or other data. In such embodiments, the hash representation may be more specific and may take into account device type, time period, output modality, etc. Using such hash representations may provide a personalization metric that is specific to the particular system aspect(s) that is used to generate the hash.

Hash representations for content presented to multiple different users 105 during a time period may be generated. For example, a first hash representation for first content presented to the user 105*a* during the time period may be generated, a second hash representation for second content presented user 105*a* during the time period may be generated, and so on. Similarly, hash representations for content presented to the other users 105*b*, 105*c* may be generated. In some cases, the same content, presented to the user 105*a*, may be presented to the one or more other users 105*b*, 105*c*, and each presentation may result in multiple instances of the same hash representation. For example, an instance of the first hash representation may be generated based on the first content being presented to the other user 105*b* during the time period, and another instance of the first hash representation may be generated based on the first content being presented to the other user 105*c* during the time period. As a further example, a third hash representation for third content (different content) presented to the user 105*b* during the time period may be generated. Thus, hash representations are generated for individual instances of content presentation, regardless of which user received the content.

Using the hash representations, the personalization metric generator 150 may determine a number of users/a number of user devices/a number of user profiles or user accounts that received the same content as the user profile/user device 110*a* of the user 105*a* during the time period. Using that number, the personalization metric generator 150 may determine the personalization metric for the user profile (or user account) of the user 105*a* for the time period.

The personalization metric generator 150 may determine a (first) number of other users 105 (at least one of users 105*b*, 105*c*)/user devices 110 (at least one of user devices 110*b*, 110*c*) received the first content based on number/instances of the first hash representation for the first content. For example, the personalization metric generator 150 may determine that the first hash representation for the first content presented to the user 105*a* matches two instances of the first hash representations for first content presented to the other users 105*b*, 105*c*, thus, two other users received the first content. Using the first number of other users (in this example, two), the personalization metric generator 150 may determine the (first) personalization metric representing a level of personalization in presenting the first content to the user profile of the user 105*a*. In some embodiments, the personalization metric may be a ratio of one (corresponding to the user 105*a*) to the total number of user profiles/user devices 110 that received the same content. Continuing with the example, the (first) personalization metric for the user profile of the user 105*a* receiving the first content may be ⅓, where three represents the total number of user profiles/user devices (110*a*, 110*b*, 110*c*)/users (105*a*, 105*b*, 105*c*) that received the first content, and one represents the user profile/user device of the user 105*a* for whom the personalization metric is generated. In some embodiments, the personalization metric may be a ratio of one (corresponding to the user 105*a*) to the total number of other user profiles/user devices (other than that of the user 105*a*) that received the same content. For example, the (first) personalization metric for the user profile of the user 105*a* receiving the first content may be ½, where two represents the total number of other user profiles/user devices (110*b*, 110*c*)/users (105*b*, 105*c*) that received the first content, and one represents the user 105*a* for whom the personalization metric is generated.

In yet other examples, the personalization metric for a user profile may be a percentage of total user profiles/user devices of the system 100 that received the same content during the time period. For example, a personalization metric for the user profile for the user 105*a* may be 30%, where 30% of the user devices 110 in the system 100/user profiles associated with the system 100 received the same content (e.g., a recommendation for a movie) within a time period (a particular day). In yet another example, the personalization metric for a user profile may be based on a percentage of user profiles/user devices that received any content during a time period. For example, N number of user profiles/user devices 110 may have received content (e.g., supplemental content via the supplement content component 585) during a time period (e.g., a give 24-hours period), where 60% of the N user profiles/user devices received the same content during that time period; in this case the personalization metric for the user profile of the user 105*a* may be 60%.

The personalization metric generator 150 may perform similar operations as the foregoing to determine a (second) number of user profiles/user devices that received the second content based on the number/instances of the second hash representation for the second content. Using the (second) number, the personalization metric generator 150 may determine the (second) personalization metric representing a level of personalization in presenting the second content to the user profile of the user 105*a*.

The personalization metric generator 150 may determine individual personalization metrics for individual pieces of content presented via the user profile of the user 105*a* during the time period. Using the individual personalization metrics, for individual pieces of content, the personalization metric generator may determine an overall personalization metric for the user profile of the user 105*a* for the time period. For example, the first personalization metric (for the first content) and the second personalization metric (for the second content) may be combined (using an average, a weighted, a sum, a mean, a median, etc.) to generate the overall personalization metric.

In some embodiments, the personalization metric generator 150 may determine individual personalization metrics for individual pieces of content presented via the user profile of the user 105*a* during the time period and corresponding to a particular domain (e.g., the music domain, the video domain, the smart home domain, etc.). For example, the personalization metric generator 150 may determine a first personalization metric for a first song presented to the user 105*a* during the time period, where the first personalization metric is determined, as described above, based on the number of other users 105 that were presented the first song during the time period. Continuing the example, the personalization metric generator 150 may determine a second personalization metric for a second song presented to the user 105*a* during the time period, where the second personalization metric is determined, as described above, based on the number of other users 105 that were presented the second song during the time period. Using such individual personalization metrics for the pieces of content (e.g., songs) corresponding to the domain, the personalization metric generator 150 may determine an overall personalization metric for the user profile of the user 105*a*, for the time period, and corresponding to the particular domain.

The personalization metric generator 150 may store (step 3) the overall personalization metric, along with other data, in a personalization metric storage 155. Within the personalization metric storage 155, a (overall) personalization metric may be associated with one or more of a profile identifier for the user profile of the user, an indication of the time period corresponding to the overall personalization metric, and a domain identifier for the domain corresponding to the overall personalization metric. In other example embodiments, the personalization metric storage 155 may store additional data.

In this manner, the personalization metric generator 150 may determine a personalization metric that represents a level of personalization of content for a user profile during a time period. In some embodiments, like the one shown in FIG. 1A, the personalization metric, along with other data, may be used to determine output data that may be presented to a user.

In some embodiments, the user 105a may provide feedback regarding personalization level of content presented to the user 105a. In some cases, the feedback may indicate the user 105a wants to receive more personalized content (e.g., the user may say "I like this [content]", "Show me more like this", etc.). In other cases, the feedback may indicate the user 105a wants to receive less personalized content (e.g., the user may say "I don't like this [content]", "Show me something different", etc.). The user 105a may provide feedback via the user device 110a using spoken inputs, entering feedback via a touchscreen of the user device 110a, performing a gesture (e.g., thumbs up, thumbs down, etc.) that is captured by a camera of the user device 110a, providing a facial expression (e.g., a smile, a frown, etc.) that may be captured by a camera of the user device 110a, etc. The user device 110a may send (step 4) user feedback data, representing the feedback from the user 105a, to the supporting device(s) 120, which may store the user feedback data in a user feedback storage 160 shown in FIG. 1A. The user feedback data may be stored along with the profile identifier of the user 105a, and may also be stored along with time information representing when the feedback is received by the supporting device(s) 120.

As shown in FIG. 1A, in some embodiments, the supporting device(s) 120 may include an output determination component 170 that may be configured to generate an output based on a personalization metric and user feedback data. The output determination component 170 may receive (step 5), from the user feedback storage 160, the user feedback data associated with the profile identifier for the user 105a. The output determination component 170 may receive (step 6), from the personalization metric storage 155, the overall personalization metric for the user profile of the user 105a.

In some embodiments, the output determination component 170 may determine, based on the overall personalization metric satisfying a condition, whether the user profile/user device(s) 110a of the user 105a received personalized outputs or non-personalized outputs. For example, if the overall personalization metric is above a threshold value (or below a threshold value depending on system configurations), then the output determination component 170 may determine that the user 105a received personalized outputs. As another example, if the overall personalization metric is below the threshold value (or above the threshold value depending on system configurations), then the output determination component 170 may determine that the user profile/user device(s) 110a of the user 105a received non-personalized outputs.

In some embodiments, when the user feedback data indicates the user 105a wants to receive personalized content (or more personalized content) and the overall personalization metric indicates that the user 105a is receiving non-personalized outputs, the output determination component 170 may determine output data representing a prompt for the user 105a to perform an action. The action may be to enter user preferences, topics of interest, etc. The action may be to modify one or more settings with respect to the supporting device(s) 120 and/or the user device 110a.

The output determination component 170 may send (step 7) the output data to the user device 110a to present to the user 105a. Such output data may cause the user 105a to provide one or more inputs, via the user device 110a or another user device, that may cause updates to the user profile (stored in a profile storage 570 described below) associated with the profile identifier for the user 105a. The inputs may enable the supporting device(s) 120 to determine content that is personalized for the user profile of the user 105a based, for example, on the user's preferences, topics of interests, etc.

The output data may be audio data representing synthesized speech corresponding to the prompt, and may be presented via one or more speakers associated with the user device 110a. The output data may be text data representing the prompt, and may be presented via a display screen of the user device 110a. In some embodiments, the output data may be presented by the user device 110a as a notification, a message (e.g., email, SMS, etc.), or in another manner.

In some embodiments, when the user feedback data indicates the user 105a does not want to receive personalized content (or wants to receive less personalized content) and the overall personalization metric indicates the user profile of the user 105a received personalized content, the output determination component 170 may determine output data representing a prompt for the user 105a to perform an action to modify one or more settings with respect to the supporting device(s) 120 and/or the user profile. The output determination component 170 may send (step 7) the output data to the user device 110a to present to the user 105a. Such output data may cause the user 105a to provide one or more inputs, via the user device 110a or another user device, that may cause updates to user profile data (stored in a profile storage 570 described below) associated with the profile identifier for the user 105a. The inputs may cause the supporting device(s) 120 to present non-personalized content to the user profile of the user 105a.

In some embodiments, the user 105a may provide feedback with respect to personalized content for a particular domain. For example, the user 105a may want to receive more (or less) personalized music suggestions or more (or less) personalized shopping suggestions. The supporting device(s) 120 may process the user feedback data to determine a corresponding domain (e.g., music domain, shopping domain, etc.). Based on the user feedback data corresponding to a particular domain, the output determination component 170 may use, from the personalization metric storage 155, the overall personalization metric for the user profile of the user 105a and corresponding to the particular domain. The prompt determined by the output determination component 170 may also correspond to the particular domain. For example, for a music domain, the prompt may ask the user 105a to provide preferences/interests with respect to music genre, artists, etc.

In some embodiments, the personalization metric generator 150 may filter the content received from the output content storage 140 to determine content corresponding to a particular domain, and to determine a personalization metric corresponding to the domain.

In some embodiments, the personalization metric generator 150 may initiate the process of determining a personalization metric based on receiving a request from the output determination component 170, which may send the request based on receiving user feedback data related to personalized content. For example, the output determination component 170 may obtain user feedback data (provided by the user 105*a*) from the user feedback storage 160, and based on the user feedback data relating to personalized content, may send a request to the personalization metric generator 150 to determine a personalization metric for the user 105*a*. The foregoing processing may occur on a periodic basis (e.g., once a week) to enable responding to user feedback related to personalized content. The request for a personalization metric may include a domain identifier if the user feedback data corresponds to a particular domain. The request may also include a time period for which content is to be processed for determining the personalization metric, where the time period may be based on when the user feedback is received. For example, the time period may include a number of days before and a number of days after the user feedback is provided (e.g., 4 days before the user 105*a* provides feedback and 4 days after the user 105*a* provides feedback). As another example, the time period may include a number of days before the user feedback is provided (e.g., 7 days before the user 105*a* provides feedback; 1 month before the user 105*a* provides feedback, etc.).

In some embodiments, the output determination component 170 may use natural language generation techniques to determine natural language output data representing the prompt. The output determination component 170 may communicate (via an orchestrator 530) with a natural language generation (NLG) component 579 (shown in FIG. 5 and described below). In some embodiments, the output determination component 170 may send (via the orchestrator 530) natural language output data to a text-to-speech (TTS) component 580 to generate synthesized speech.

In some embodiments, the system 100 may use user feedback to determine whether a determined personalization metric is accurate. The system 100 may solicit user feedback, for example, by outputting a prompt such as "Are you receiving personalized content?". Based on the user response, the personalization metric generator 150 may determine an updated personalization metric to reflect whether the user is receiving personalized content or not based on the user's perception.

FIG. 1B is a conceptual diagram illustrating the system 100 configured for determining a personalization metric for a system aspect, according to embodiments of the present disclosure. In some embodiments, the personalization metric generator 150 may receive a request from a skill component 590 or a supplemental content component 585 for a personalization metric(s) for different system aspects, in response to which the personalization metric generator 150 may determine one or more personalization metrics as described below. In other embodiments, the personalization metric generator 150 may determine personalization metrics for various system aspects on a periodic basis or in response to requests from another component. The personalization metric generator 150 may send the personalization metric(s) to the skill component 590/the supplemental content component 585 on a periodic basis, or when certain conditions are satisfied (e.g., the personalization metric falls below a threshold value, the personalization metric exceeds a threshold value, etc.).

As used herein, a system aspect may include a domain, a content category for a domain, an output modality, a device type, a geographic location, a skill component, or other aspects of the system 100. As described herein, example domains are music domain, video domain, smart home domain, etc. Example content categories for the music domain may be music genre, artist(s), music release date, etc. Example content categories for the video domain may be video type, genre, actors, video release date, etc. An output modality refers to a manner in which content is presented to a user. Example output modalities may be display cards, synthesized speech, notifications, messages, etc. Example device types may correspond to the example user devices 110 shown in FIG. 9.

In some example cases, the personalization metric generator 150 may determine personalization metrics for domains representing a level of personalized content corresponding to the domain presented to users (e.g., a personalization metric for music content, a personalization metric for video content, etc.). In other example cases, the personalization metric generator 150 may determine personalization metrics for content categories representing a level of personalized content corresponding to the content category that is presented to users (e.g., a personalization metric for music content corresponding to a first genre, a personalization metric for music content corresponding to a second genre, etc.). In yet other examples, the personalization metric generator 150 may determine personalization metrics for output modalities representing a level of personalized content corresponding to the output modality (e.g., a personalization metric for content presented as synthesized speech, a personalization metric for content presented via displayed cards, etc.).

In some example cases, the personalization metric generator 150 may determine a personalization metric for more than one system aspect. For example, the personalization metric generator 150 may determine a personalization metric representing a level of personalization with respect to content corresponding to a music domain and a music genre. As another example, the personalization metric generator 150 may determine a personalization metric representing a level of personalization with respect to content corresponding to a particular geographic region and synthesized speech outputs.

In addition to (or alternatively to) the data described above in connection with FIG. 1A, the output content storage 140 may store a domain, an output modality, a device type, a geographic location, a skill component and/or other system aspects corresponding to presented content. In some embodiments, the output content storage 140 may also store a content category corresponding to the presented content. In other embodiments, the personalization metric generator 150 may send a request to a category generator 175 to determine one or more content categories corresponding to the presented content (as described below in further detail).

The personalization metric generator 150 may receive (step 10) data corresponding to content presented to multiple different users 105. The personalization metric generator 150 may request (or retrieve) such data from the output content storage 140, and in some embodiments, may request data corresponding to a particular time period (e.g., last 24 hours, last 48 hours, last week, last month, last quarter, last year, etc.). In some embodiments, the personalization metric generator 150 may request data corresponding to a particular system aspect depending on the aspect(s) for which a personalization metric(s) is to be determined. For example, if a personalization metric for the music domain is to be determined, then the personalization metric generator 150 may request content (and related data) corresponding to the music domain. As another example, if a personalization metric for a particular geographic region is to be determined, then the personalization metric generator 150 may request content (and related data) corresponding to that geographic region. In other embodiments, the personalization metric generator 150 may receive content corresponding to multiple different system aspects, and may filter the content based on one or more system aspects for which a personalization metric is to be determined.

The personalization metric generator 150 may determine hash representations of the content by using (step 11) the hash generator 130. The personalization metric generator 150 may send data (image data and/or text data) representing the content to the hash generator 130. The hash generator 130, in turn, may send hash representations for individual pieces of content.

Using the hash representations, the personalization metric generator 150 may determine a number of users that received the same piece of content during a time period. Using the number of users that received the same piece of content, the personalization metric generator 150 may determine the personalization metric for a system aspect for the time period. As described above, the personalization metric for a piece of content may be ratio of the number of users that received the content, may be a percentage of total system users that received the content, etc.

In some embodiments, the personalization metric generator 150 may determine a content category corresponding to the content by using (step 12) the category generator 175. The category generator 175 may be configured to perform topic or category extraction techniques. Such techniques may involve use of natural language processing (NLP) models, one or more rules, external data sources, etc. In some embodiments, the category generator 175 may employ text-from-image recognition techniques (e.g., Optical Character Recognition). The personalization metric generator 150 may send data (e.g., image data and/or text data) representing the content to the category generator 175. In some embodiments, the personalization metric generator 150 may also send an indication of a domain corresponding to the content. In some embodiments, the category generator 175 may be configured to determine a content category from a set of content categories. In some embodiments, the category generator 175 may be configured to determine a content category for a particular content category type. For example, the category generator 175 may determine a first music genre, from a set of music genres, corresponding to a piece of music content. As another example, the category generator 175 may determine a first movie genre, from a set of movie genres, corresponding to a piece of movie content.

The personalization metric generator 150 may determine individual personalization metrics for individual pieces of content corresponding to a system aspect, and then determine an overall personalization metric for the system aspect using the individual personalization metrics. For example, the personalization metric generator 150 may determine a first personalization metric for first content corresponding to the music domain and presented during a time period, a second personalization metric for second content corresponding to the music domain and presented during the time period, a third personalization metric for third content corresponding to the music domain and presented during the time period, and so on. An example overall personalization metric for the music domain may be determined by using (e.g., combining, an average, a weighted average, a sum, a mean, a median, etc.) the first, second, third, etc. personalization metrics. As another example, the personalization metric generator 150 may determine a first personalization metric for first content corresponding to a geographic region and presented during a time period, a second personalization metric for second content corresponding to the geographic region and presented during the time period, a third personalization metric for third content corresponding to the geographic region and presented during the time period, and so on. An example overall personalization metric for the geographic region may be determined by using (e.g., combining, an average, a weighted average, a sum, a mean, a median, etc.) the first, second, third, etc. personalization metrics.

The personalization metric generator 150 may store (step 13) the overall personalization metric for a system aspect, along with other data, in the personalization metric storage 155. The other data stored in the personalization metric storage 155 may include an indication of the time period corresponding to the overall personalization metric, data identifying one or more system aspects (e.g., a domain, content categories, a geographic location, an output modality, a device type, a skill component, etc.).

In some embodiments, a skill component 590 or a supplemental content component 585 may obtain (step 14) the stored personalization metric (and corresponding data) for a system aspect(s) from the personalization metric storage 155. For example, the skill component 590 may request a personalization metric corresponding to the skill component 590. As another example, the skill component 590 may request a personalization metric corresponding to a particular content category. As yet another example, the supplemental content component 585 may request a personalization metric for a particular output modality. As a further example, the supplemental content component 585 may request a personalization metric for a particular geographic location.

The skill component 590 and the supplemental content component 585 may use the received personalization metric to determine output data to be presented to a user 105. Depending on whether personalized content for a particular system aspect is to be increased or decreased, and based on what the personalization metric indicates, the skill component 590 and the supplemental content component 585 may determine personalized output data or non-personalized output data. For example, if a personalization metric indicates that content being presented for a particular content category (e.g., a particular music genre) is not personalized, and there is a desire to increase personalized outputs for that content category, then personalized output data corresponding to the content category may be determined for presentation. As another example, if a personalization metric indicates that content being presented for a domain is personalized, and there is a desire to decrease personalized outputs for that domain, then non-personalized output data corresponding to the domain may be determined for presentation.

In some embodiments, the skill component 590 and the supplemental content component 585 may also consider user feedback data, along with the personalization metric, in determining whether to present personalized output data or non-personalized output data.

In determining personalized output data, the skill component 590 and the supplemental content component 585 may use user profile data corresponding to the user 105 to whom the output data is to be presented.

In some embodiments, the skill component 590/the supplemental content component 585 may receive user recognition data 395 (shown in FIGS. 3A and 3B) including a user identifier for the user 105, using which, user profile data for the user 105 may be retrieved and used. In cases where the user recognition data 395 is provided to and/or used by the skill component 590/the supplemental content component 585 in determining content for the user 105, such content may be considered to be personalized for the user profile of the user 105. Such content may be associated with an indicator (e.g., personalized indicator) representing that it is personalized for a particular user profile. Data corresponding to the content and the personalized indicator may be stored in the output content storage 140. In some embodiments, the personalization metric generator 150 may use the personalized indicator as an input to determine a personalization metric with respect to the particular content. For example, the personalization metric generator 150 may increase (or decrease) the personalization metric, based on the personalized indicator, to represent that the content is personalized. In some embodiments, the personalization metric generator 150 may use a default metric, indicating that the content is personalized for the particular user profile, based on the personalization indicator associated with the content. The system 100 may identify that particular content, e.g., a movie recommendation, is presented to the user 105a based on a user preference for such content, e.g., movie genre, movie actors, etc., that is included in the user's profile, which was retrieved using the user recognition data 395 corresponding to the user 105a, and may identify such content as personalized, even when other users 105b, 105c may have received the same movie recommendation during a given time period.

In some cases, content may be personalized when data specific to a user profile or a user account is used to determine the content for presentation to a user, and content may be non-personalized when such specific data is not used in determining the content. Such specific data may be stored in a user profile or user account, may be provided as preferences by a user, may be derived from other sources, etc. Content may be personalized based on geographic locations of users, type of user devices associated with users, preferences for particular entities, past interaction data, purchase history, etc. For example, users associated with a first geographic location may receive first content that may be specific for the first geographic location (e.g., weather alerts for a particular city, sporting team information associated with a particular city, etc.). As another example, users associated with a particular device type (e.g., a particular brand of smartwatch) may receive content that is specific for the device type (e.g., apps for the smartwatch, accessories for the smartwatch, etc.). As yet another example, a user profile that includes a preference for a particular genre of media (e.g., comedy movies) may receive content for that genre (e.g., comedy movie recommendations, new comedy movie releases, etc.).

In some embodiments, the skill component 590 or the supplemental content component 585 may use a personalization metric as a historical measure to understand how personalized past content was, and may predict how personalized subsequently presented (future) content will be. One or more models, rules, etc. may be used to predict a personalization metric for content that is yet to be presented, and may take as an input a historic personalization metric(s) related to same or similar content, the same domain, the same content category, the same output modality, or other system aspect. The system component(s) may use the predicted personalization metric to determine whether the content should or should not be presented to a particular user. In some embodiments, the system may aim to increase engagement between the user and the system, for example, by presenting personalized content to the user and the user interacting with it because it is of interest to the user. The system may use the personalization metrics to identify user preferences.

Figure 1C:
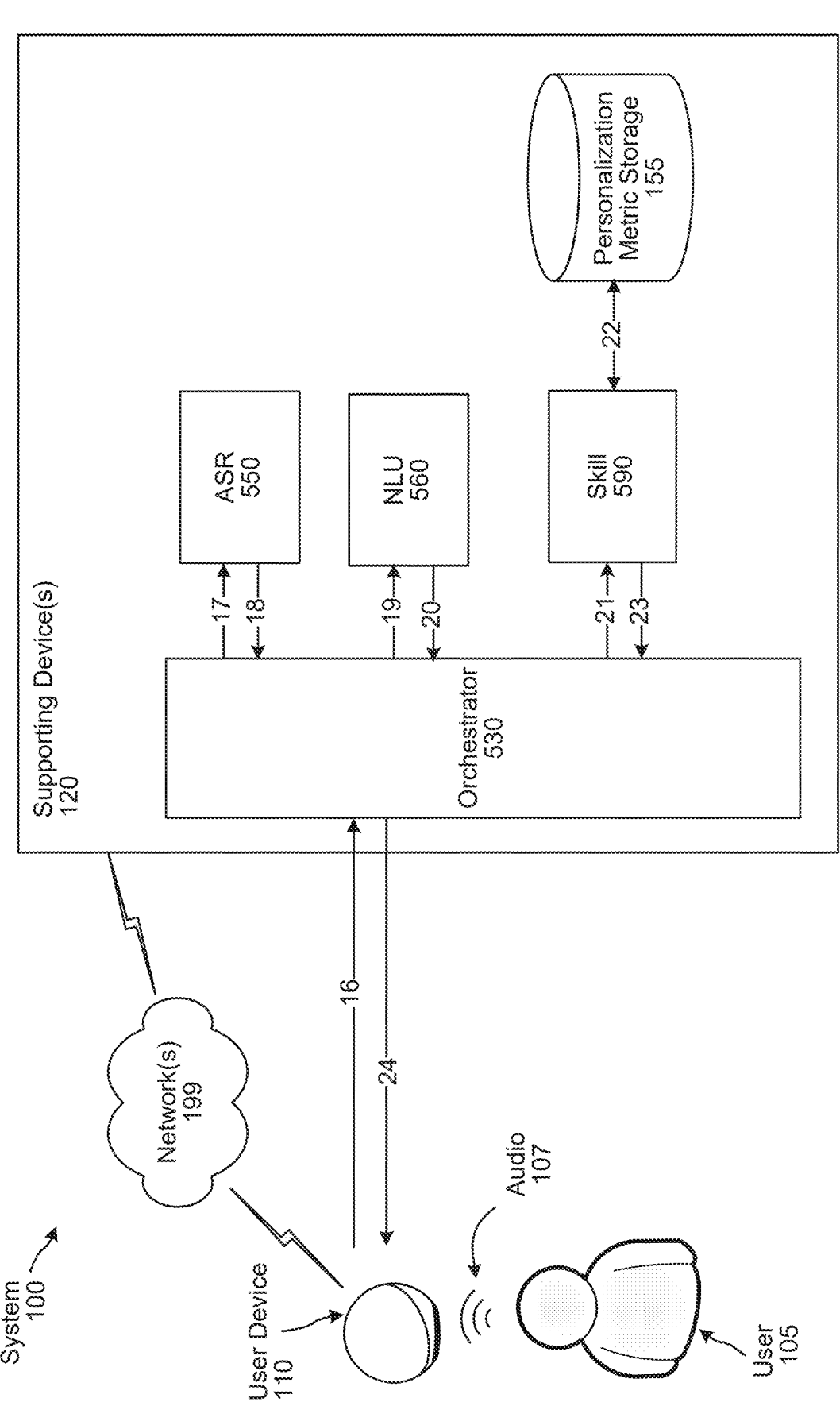
FIG. 1C is a conceptual diagram illustrating a system for processing a user input requesting a personalization metric, according to embodiments of the present disclosure.

FIG. 1C is a conceptual diagram illustrating the system 100 processing a user input requesting a personalization metric. The supporting device(s) 120 may use one or more components shown in and described in relation to FIG. 5 to process the user input. A user 105 may provide a user input that is captured by a user device 110 shown in FIG. 1C. The user 105 may provide a natural language input that may be spoken or entered via an interface of the user device 110. In other cases, the user 105 may provide other types of inputs, such as gesture inputs, etc. For spoken inputs, the user device 110 may capture audio using a microphone(s) of the user device 110, and may send (step 16) audio data to the supporting device(s) 120. For other types of inputs, the user device 110 may send other type of input data to the supporting device(s) 120. In a non-limiting example, the user 105 may say "How personalized is the content being presented to me?" or "Am I getting personalized content?"

In the case that the user input is a spoken input, an orchestrator component 530 may send (step 17) the audio data to an ASR component 550, which may process the audio data (as described below in relation to FIG. 5) to determine ASR results data corresponding to words spoken by the user 105. The ASR component 550 may send (step 18) the ASR results data to the orchestrator component 530.

The orchestrator component 530 may send (step 19) the ASR results data to a NLU component 560 for processing. The NLU component 560 may determine NLU results data corresponding to the user input (as described below in relation to FIG. 5). In the non-limiting example, where the user input is "How personalized is the content being presented to me?" or "Am I getting personalized content?", the NLU component 560 may determine the user's intent is to receive a personalization metric. The NLU component 560 may also determine a skill component 590 that is capable of responding to the user's request for a personalization metric, and may include an indicator of the skill component 590 in the NLU results data. The NLU component 560 may send (step 20) the NLU results data to the orchestrator component 530.

The orchestrator component 530 may send (step 21) the NLU results data to the skill component 590, which may determine a response to the user input. Continuing with the non-limiting example, the skill component 590 may determine an output that is based on a personalization metric associated with the user profile of the user 105. The skill component 590 may retrieve (step 22), from the personalization metric storage 155, a personalization metric(s) associated with the user profile of the user 105.

The skill component 590 may retrieve or may determine from the retrieved personalization metrics which metric to present to the user 105. For example, if the user 105 provides the user input of step 16 in response to a piece of content being presented at the device 110, then the skill component 590 may present a personalization metric that is determined with respect to the presented content and/or a personalization metric that is determined with respect to the domain associated with the presented content. As another example, the skill component 590 may present an overall personalization metric for the user profile of the user 105.

The skill component 590 (or another component of the supporting device(s) 120) may determine a natural language output data based on or including the personalization metric(s). The skill component 590 may send (step 23) the output data to the orchestrator component 530. The output data may be presented via the user device 110 as synthesized speech, displayed text or graphics, etc.

In this manner, the system 100 may inform the user 105 of a level of personalization for the content being presented via the user profile of the user 105. The user 105 may request a level of personalization for a particular domain, for a particular time period, etc. The user 105 may provide feedback in response to the personalization metric or may modify one or more settings to receive more or less personalized content. The system 100 may inform the user 105 that the content being presented is not personalized to, for example, show that the system presented a generic response (that was presented to multiple other users) and is not tracking the user's activity, especially without prior authorization from the user.

In some embodiments, the system 100 may present a personalization metric to the user 105 in comparison to other users' personalization metrics. For example, the system 100 may present graphics, such as a graph, a scale, a chart, etc., including an indication of the user 105's personalization metric within the graphics, to allow the user to compare it to other users of the system, a group of users of the system, etc. The personalization metric may be presented in manner such that the user may be able to compare it to personalization metrics other system aspects. For example, a scale may show a first personalization metric for the user 105 for a first domain, a second personalization metric for the user 105 for a second domain, etc.

FIG. 2A shows example data that may be used or determined by the personalization metric generator 150 with regards to determining a personalization metric for a user 105 for a time period for a particular domain (e.g., the video domain). The example data shown may correspond to the user 105 associated with a user profile ID shown in column 202. Column 204 shows various content presented to the user 105, which, for example, are different movie titles. As shown, a hash representation for the individual pieces of content may be determined and stored. Column 206 shows personalization metrics corresponding to the individual pieces of content. The personalization metric generator 150 may use (e.g., combine) the individual personalization metrics shown in column 206 to determine an overall personalization metric, which in this example, may correspond to the user profile ID shown in column 202 and may represent a level of personalization of content corresponding to the video domain.

FIG. 2B shows example data that may be used or determined by the personalization metric generator 150 with regards to determining a personalization metric for a particular domain for a time period. Column 220 shows example content corresponding to the domain shown in column 222. The example content in this case are movie titles that are presented to multiple different users during a time period. The personalization metric generator 150 may determine personalization metrics, shown in column 224, corresponding to individual pieces of content presented during the time period. As shown by rows 226 and 227, the same content ([first movie title]) may be presented to different users, and the personalization metric for that content may be the same. In some embodiments, the personalization metric generator 150 may combine the rows 226 and 227, or delete one of them, based on them relating to the same content, and prior to determining an overall personalization metric. The personalization metric generator 150 may use (e.g., combine) the individual personalization metrics shown in column 224 to determine an overall personalization metric, which in this example, may correspond to the domain shown in column 222 and may represent a level of personalization of content presented to various users during the time period.

FIG. 2C shows other example data that may be used to determine personalization metrics for different system aspects. Column 232 shows example device types for which a personalization metric may be determined. Column 234 shows example geographic location information based on which a personalization metric may be determined. Column 236 shows example output modalities for which a personalization metric may be determined.

FIG. 2D shows example data corresponding to content and that may be generated by the content category generator 175. Column 240 shows a genre that may be determined by the content category generator 175. Column 242 shows actors, column 244 shows release year and column 246 shows a director, one or more of which may be determined by the content category generator 175. Additionally or alternative content categories, for the video domain, may be determined. Different content categories may be determined for different domains.

Figure 3A:
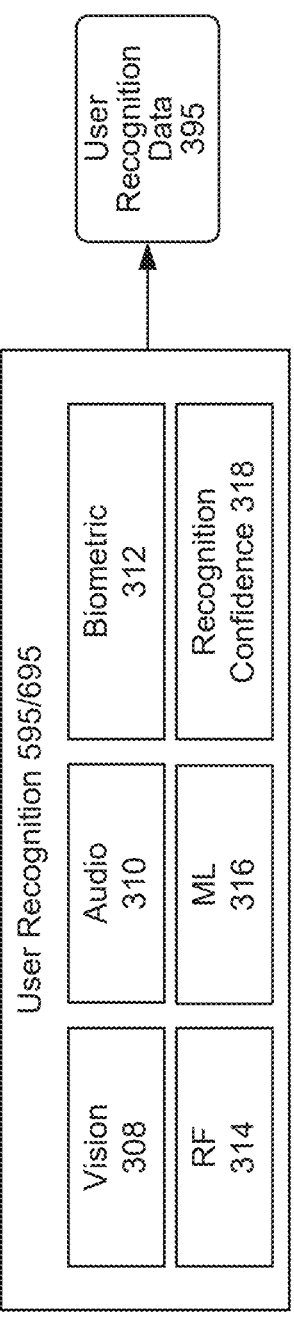
FIG. 3A is a schematic diagram of an illustrative architecture in which sensor data is combined to recognize one or more users according to embodiments of the present disclosure.

The device 110 and/or the supporting device(s) 120 may include a user recognition component 595 (shown in FIG. 5) that recognizes one or more users using a variety of data. As illustrated in FIG. 3A, the user recognition component 595 may include one or more subcomponents including a vision component 308, an audio component 310, a biometric component 312, a radio frequency (RF) component 314, a machine learning (ML) component 316, and a recognition confidence component 318. In some instances, the user recognition component 595 may monitor data and determinations from one or more subcomponents to determine an identity of one or more users associated with data input to the device 110 and/or the supporting device(s) 120. The user recognition component 595 may output user recognition data 395, which may include a user identifier (or profile identifier) associated with a user the user recognition component 595 determines originated data input to the device 110 and/or the supporting device(s) 120. The user recognition data 395 may be used to inform processes performed by various components of the device 110 and/or the supporting device(s) 120.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user recognition component 595 may utilize determinations from additional components to determine an identity of a user. The vision component 308 can be used in conjunction with other components to determine an identity of a user. For example, the user recognition component 595 may use data from the vision component 308 with data from the audio component 310 to identify what user's face appears to be speaking at the same time audio is captured by a device 110 the user is facing for purposes of identifying a user who spoke an input to the device 110 and/or the supporting device(s) 120.

The overall system of the present disclosure may include biometric sensors that transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. The biometric component 312 may distinguish between a user and sound from a television, for example. Thus, the biometric component 312 may incorporate biometric information into a confidence level for determining an identity of a user. Biometric information output by the biometric component 312 can be associated with specific user profile data such that the biometric information uniquely identifies a user profile of a user.

The radio frequency (RF) component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a first location during the day (e.g., at work or at school). In this example, the ML component 316 would factor in past behavior and/or trends in determining the identity of the user that provided input to the device 110 and/or the supporting device(s) 120. Thus, the ML component 316 may use historical data and/or usage patterns over time to increase or decrease a confidence level of an identity of a user.

In at least some instances, the recognition confidence component 318 receives determinations from the various components 308, 310, 312, 314, and 316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones) to facilitate recognition of a user. The audio component 310 may perform audio recognition on an audio signal to determine an identity of the user and associated user identifier. In some instances, aspects of device 110 and/or the supporting device(s) 120 may be configured at a computing device (e.g., a local server). Thus, in some instances, the audio component 310 operating on a computing device may analyze all sound to facilitate recognition of a user. In some instances, the audio component 310 may perform voice recognition to determine an identity of a user.

The audio component 310 may also perform user identification based on audio data 511 input into the device 110 and/or the supporting device(s) 120 for speech processing. The audio component 310 may determine scores indicating whether speech in the audio data 511 originated from particular users. For example, a first score may indicate a likelihood that speech in the audio data 511 originated from a first user associated with a first user identifier, a second score may indicate a likelihood that speech in the audio data 511 originated from a second user associated with a second user identifier, etc. The audio component 310 may perform user recognition by comparing speech characteristics represented in the audio data 511 to stored speech characteristics of users (e.g., stored voice profiles associated with the device 110 that captured the spoken user input).

Figure 3B:
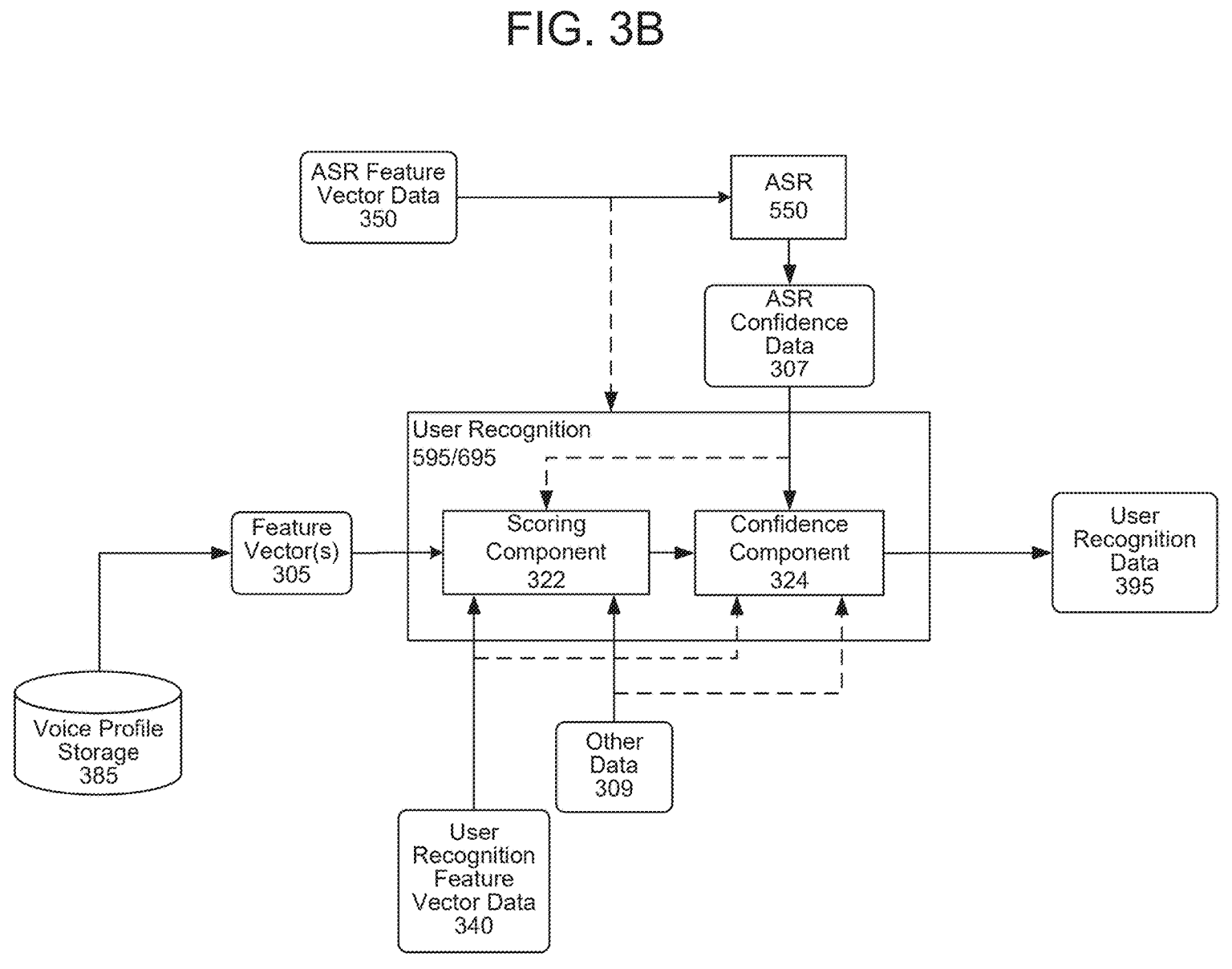

FIG. 3B illustrates user recognition processing as may be performed by the user recognition component 595. The ASR component 550 performs ASR processing on ASR feature vector data 350. ASR confidence data 307 may be passed to the user recognition component 595.

The user recognition component 595 performs user recognition using various data including the user recognition feature vector data 340, feature vectors 305 representing voice profiles of users of the system 100, the ASR confidence data 307, and other data 309. The user recognition component 595 may output the user recognition data 395, which reflects a certain confidence that the user input was spoken by one or more particular users. The user recognition data 395 may include one or more user identifiers (e.g., corresponding to one or more voice profiles). Each user identifier in the user recognition data 395 may be associated with a respective confidence value, representing a likelihood that the user input corresponds to the user identifier. A confidence value may be a numeric or binned value.

The feature vector(s) 305 input to the user recognition component 595 may correspond to one or more voice profiles. The user recognition component 595 may use the feature vector(s) 305 to compare against the user recognition feature vector 340, representing the present user input, to determine whether the user recognition feature vector 340 corresponds to one or more of the feature vectors 305 of the voice profiles. Each feature vector 305 may be the same size as the user recognition feature vector 340.

To perform user recognition, the user recognition component 595 may determine the device 110 from which the audio data 511 originated. For example, the audio data 511 may be associated with metadata including a device identifier representing the device 110. Either the device 110 or the supporting device(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 340 produced from the audio data 511. The user recognition component 595 may send a signal to voice profile storage 385, with the signal requesting only audio data and/or feature vectors 305 (depending on whether audio data and/or corresponding feature vectors are stored) associated with the device identifier, the group profile identifier, and/or the user identifiers represented in the metadata. This limits the universe of possible feature vectors 305 the user recognition component 595 considers at runtime and thus decreases the amount of time to perform user recognition processing by decreasing the amount of feature vectors 305 needed to be processed. Alternatively, the user recognition component 595 may access all (or some other subset of) the audio data and/or feature vectors 305 available to the user recognition component 595. However, accessing all audio data and/or feature vectors 305 will likely increase the amount of time needed to perform user recognition processing based on the magnitude of audio data and/or feature vectors 305 to be processed.

If the user recognition component 595 receives audio data from the voice profile storage 385, the user recognition component 595 may generate one or more feature vectors 305 corresponding to the received audio data.

The user recognition component 595 may attempt to identify the user that spoke the speech represented in the audio data 511 by comparing the user recognition feature vector 340 to the feature vector(s) 305. The user recognition component 595 may include a scoring component 322 that determines respective scores indicating whether the user input (represented by the user recognition feature vector 340) was spoken by one or more particular users (represented by the feature vector(s) 305). The user recognition component 595 may also include a confidence component 324 that determines an overall accuracy of user recognition processing (such as those of the scoring component 322) and/or an individual confidence value with respect to each user potentially identified by the scoring component 322. The output from the scoring component 322 may include a different confidence value for each received feature vector 305. For example, the output may include a first confidence value for a first feature vector 305a (representing a first voice profile), a second confidence value for a second feature vector 305b (representing a second voice profile), etc. Although illustrated as two separate components, the scoring component 322 and the confidence component 324 may be combined into a single component or may be separated into more than two components.

The scoring component 322 and the confidence component 324 may implement one or more trained machine learning models (such as neural networks, classifiers, etc.) as known in the art. For example, the scoring component 322 may use probabilistic linear discriminant analysis (PLDA) techniques. PLDA scoring determines how likely it is that the user recognition feature vector 340 corresponds to a particular feature vector 305. The PLDA scoring may generate a confidence value for each feature vector 305 considered and may output a list of confidence values associated with respective user identifiers. The scoring component 322 may also use other techniques, such as GMMs, generative Bayesian models, or the like, to determine confidence values.

The confidence component 324 may input various data including information about the ASR confidence 307, speech length (e.g., number of frames or other measured length of the user input), audio condition/quality data (such as signal-to-interference data or other metric data), fingerprint data, image data, or other factors to consider how confident the user recognition component 595 is with regard to the confidence values linking users to the user input. The confidence component 324 may also consider the confidence values and associated identifiers output by the scoring component 322. For example, the confidence component 324 may determine that a lower ASR confidence 307, or poor audio quality, or other factors, may result in a lower confidence of the user recognition component 595. Whereas a higher ASR confidence 307, or better audio quality, or other factors, may result in a higher confidence of the user recognition component 595. Precise determination of the confidence may depend on configuration and training of the confidence component 324 and the model(s) implemented thereby. The confidence component 324 may operate using a number of different machine learning models/techniques such as GMM, neural networks, etc. For example, the confidence component 324 may be a classifier configured to map a score output by the scoring component 322 to a confidence value.

The user recognition component 595 may output user recognition data 395 specific to a one or more user identifiers. For example, the user recognition component 595 may output user recognition data 395 with respect to each received feature vector 305. The user recognition data 395 may include numeric confidence values (e.g., 0.0-1.0, 0-1000, or whatever scale the system is configured to operate). Thus, the user recognition data 395 may output an n-best list of potential users with numeric confidence values (e.g., user identifier 123—0.2, user identifier 234—0.8). Alternatively or in addition, the user recognition data 395 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 595 may output an n-best list of user identifiers with binned confidence values (e.g., user identifier 123— low, user identifier 234—high). Combined binned and numeric confidence value outputs are also possible. Rather than a list of identifiers and their respective confidence values, the user recognition data 395 may only include information related to the top scoring identifier as determined by the user recognition component 595. The user recognition component 595 may also output an overall confidence value that the individual confidence values are correct, where the overall confidence value indicates how confident the user recognition component 595 is in the output results. The confidence component 324 may determine the overall confidence value.

The confidence component 324 may determine differences between individual confidence values when determining the user recognition data 395. For example, if a difference between a first confidence value and a second confidence value is large, and the first confidence value is above a threshold confidence value, then the user recognition component 595 is able to recognize a first user (associated with the feature vector 305 associated with the first confidence value) as the user that spoke the user input with a higher confidence than if the difference between the confidence values were smaller.

The user recognition component 595 may perform thresholding to avoid incorrect user recognition data 395 being output. For example, the user recognition component 595 may compare a confidence value output by the confidence component 324 to a threshold confidence value. If the confidence value does not satisfy (e.g., does not meet or exceed) the threshold confidence value, the user recognition component 595 may not output user recognition data 395, or may only include in that data 395 an indicator that a user that spoke the user input could not be recognized. Further, the user recognition component 595 may not output user recognition data 395 until enough user recognition feature vector data 340 is accumulated and processed to verify a user above a threshold confidence value. Thus, the user recognition component 595 may wait until a sufficient threshold quantity of audio data of the user input has been processed before outputting user recognition data 395. The quantity of received audio data may also be considered by the confidence component 324.

The user recognition component 595 may be defaulted to output binned (e.g., low, medium, high) user recognition confidence values. However, such may be problematic in certain situations. For example, if the user recognition component 595 computes a single binned confidence value for multiple feature vectors 305, the system may not be able to determine which particular user originated the user input. In this situation, the user recognition component 595 may override its default setting and output numeric confidence values. This enables the system to determine a user, associated with the highest numeric confidence value, originated the user input.

The user recognition component 595 may use other data 309 to inform user recognition processing. A trained model (s) or other component of the user recognition component 595 may be trained to take other data 309 as an input feature when performing user recognition processing. Other data 309 may include a variety of data types depending on system configuration and may be made available from other sensors, devices, or storage. The other data 309 may include a time of day at which the audio data 511 was generated by the device 110 or received from the device 110, a day of a week in which the audio data audio data 511 was generated by the device 110 or received from the device 110, etc.

The other data 309 may include image data or video data. For example, facial recognition may be performed on image data or video data received from the device 110 from which the audio data 511 was received (or another device). Facial recognition may be performed by the user recognition component 595. The output of facial recognition processing may be used by the user recognition component 595. That is, facial recognition output data may be used in conjunction with the comparison of the user recognition feature vector 340 and one or more feature vectors 305 to perform more accurate user recognition processing.

The other data 309 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 309 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 511 was received is a smart watch or vehicle belonging to a user A, the fact that the device 110 belongs to user A may increase a user recognition confidence value associated with user A and/or decrease a user recognition confidence value associated with user B.

The other data 309 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 511. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 309 may include data representing activity of a particular user that may be useful in performing user recognition processing. For example, a user may have recently entered a code to disable a home security alarm. A device 110, represented in a group profile associated with the home, may have generated the audio data 511. The other data 309 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 309 and considered by the user recognition component 595.

Depending on system configuration, the other data 309 may be configured to be included in the user recognition feature vector data 340 so that all the data relating to the user input to be processed by the scoring component 322 may be included in a single feature vector. Alternatively, the other data 309 may be reflected in one or more different data structures to be processed by the scoring component 322.

Figure 4:
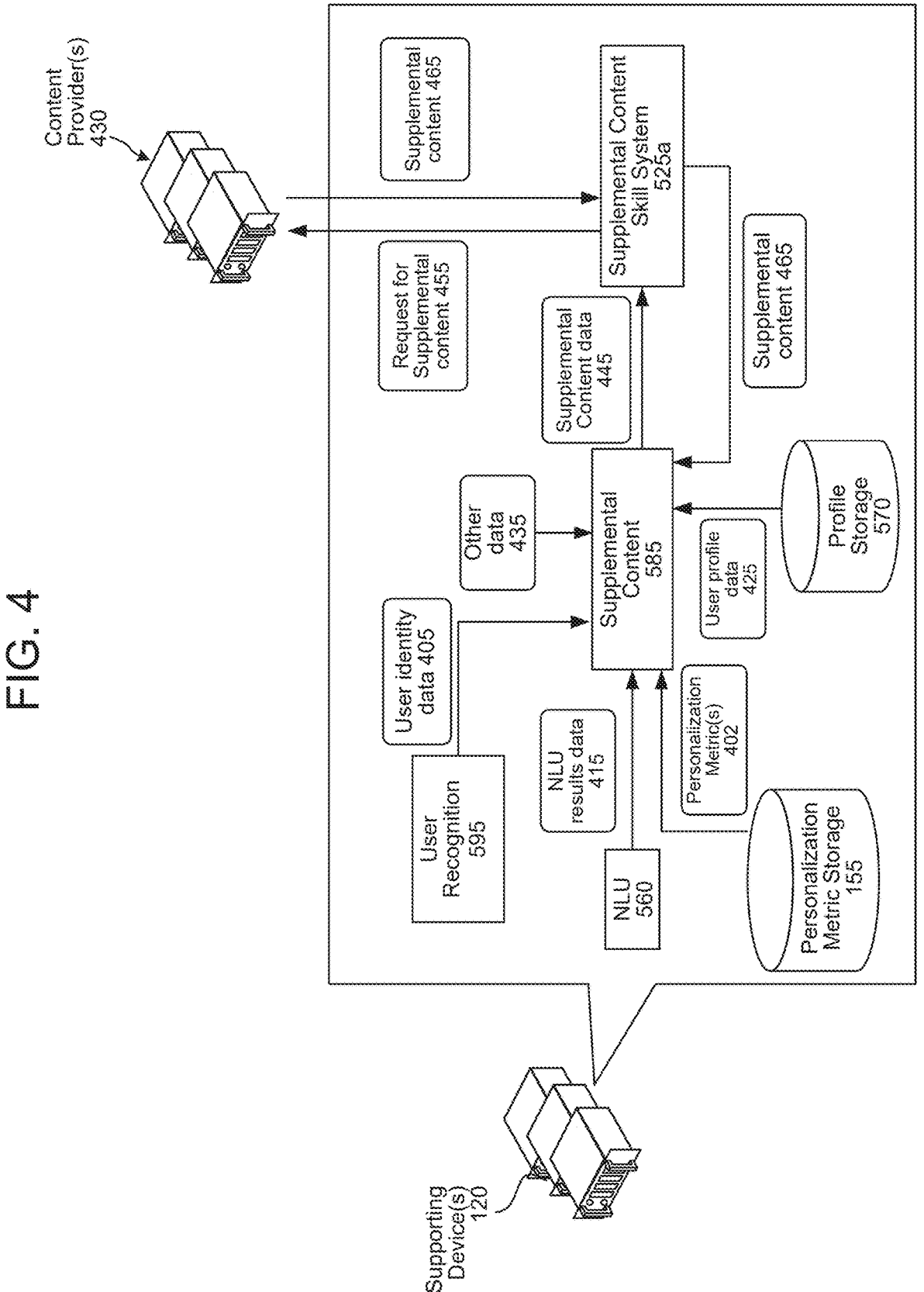
FIG. 4 is a conceptual diagram illustrating how a supplemental content component may determine when supplemental content should be output, according to embodiments of the present disclosure.

FIG. 4 illustrates how the supplemental content component 585 may determine when supplemental content (e.g., associated with but not directly responsive to a natural language input) should be output. As illustrated, the various components in FIG. 4 communicate directly. It will be appreciated that some or all of the components illustrated in FIG. 4 may communicate through the orchestrator component 530. In addition, while FIG. 4 illustrates a dedicated supplemental content component 585, it will be appreciated that some or all of the processes performed by the supplemental content component 585 disclosed herein may be performed by one or more other components of the supporting device(s) 120, such as the orchestrator component 530.

Each time the NLU component 560 outputs NLU results data 415, the NLU results data 415 may be sent to the supplemental content component 585. The supplemental content component 585 may determine whether supplemental content, associated with but not directly responsive to the natural language input represented by the NLU results data 415, should be output to the natural language input-originating user 105.

The supplemental content component 585 may base its determinations at least in part on non-user specific data, such as skill system 525-provided data.

The supplemental content component 585 may determine whether supplemental content should be output based at least in part on information accompanying data responsive to a natural language input and provided to the supporting device(s) 120 by an skill system 525. Such information is represented as other data 435 in FIG. 4. In addition to providing the supporting device(s) 120 with data responsive to a natural language input, a skill system 525 may provide the supporting device(s) 120 with presentation framework data indicating, for example, the types of content (e.g., audio, image, video, etc.) represented in the data (responsive to the natural language input) as well as one or more devices associated with the natural language input-originating user 105 that should be used to output the different types of content. The presentation framework data may, in at least some examples, include information indicating the supporting device(s) 120 should determine supplemental content.

When the presentation framework data includes such information, the supplemental content component 585 may determine supplemental content should be output. In at least some other examples, such information may simply be an input into a model run by the supplemental content component 585 for determining when supplemental content is to be output.

The supplemental content component 585 may determine whether supplemental content should be output based at least in part on data that is provided to the supporting device(s) 120 by a skill system 525, but which does not accompany data responsive to a natural language input. Such data is represented as other data 435 in FIG. 4. A skill system 525 may provide the supporting device(s) 120 with data indicating that any time the NLU results data 415 includes a particular intent, the supplemental content component 585 should query the skill system 525 as to whether the skill system 525 has supplemental content that may be output. For example, a concert ticket skill system may provide the supporting device(s) 120 with data indicating that anytime the NLU results data 415 includes a <PlayMusic> intent, the supplemental content component 585 should query the concert ticket skill system as to whether the concert ticket skill system has access to information indicating a concert put on by an artist represented in the NLU results data 415. For further example, an electronic calendar skill system may provide the supporting device(s) 120 with data indicating that anytime the NLU results data 415 includes an <OutputTime> intent, the supplemental content component 585 should query the electronic calendar skill system as to whether the electronic calendar skill system has calendar entries associated with an electronic calendar associated with the natural language input-originating device 110 and/or user 105. Yet further, for example, a traffic report skill system may provide the supporting device(s) 120 with data indicating that anytime the NLU results data 415 includes a <BookRide> intent, the supplemental content component 585 should query the traffic report skill system to provide current traffic report information.

The supplemental content component 585 may determine whether supplemental content should be output based at least in part on an intent represented in the NLU results data 415. The supporting device(s) 120 may store intent pair data (illustrated as other data 435 in FIG. 4) corresponding to pairs of intents. Each pair of intents may be associated with a respective score representing a likelihood that a second natural language input, corresponding to the second intent of the pair, will be received from the same user within a time threshold subsequent to content responsive to the first natural language input being output. The scores of various intent pairs may be normalized. The intent pair data may be untailored with respect to any given user of the system. For example, the intent pair data may include the following intent pairs with corresponding scores:

[0.345] <GetWeather>; <GetTraffic>
[0.217] <OrderPizza>; <PlayMovie>
[0.121] <PlayMusic>; <SetVolume>

The intent pair data may be configured based solely upon the natures of the intents. For example, a pair of intents may include a <PlayMusic> intent and a <ChangeVolume> intent. The pair of intents may be associated with a score representing a likelihood that a user may provide a first natural language input, corresponding to the <PlayMusic> intent, prior to the user inputting a second natural language input, corresponding to the <ChangeVolume> intent, based solely on the <PlayMusic> intent and the <ChangeVolume> intent both relating to the output of audio. For further example, a pair of intents may include a <BookPlaneTicket> intent and a <GetWeather> intent. This pair of intents may be associated with a score indicating a likelihood that users who purchase plane tickets often ask about the weather for their destination.

Intents may also be paired based on system usage history associated with various different users. Pairing of the intents may be skill system agnostic. Thus, a single skill system may be associated with both intents of a pair of intents, or a first intent of a pair may be associated with a first skill system while the second intent of the pair may be associated with a second skill system. For example, a pair of intents may include a <PlayMusic> intent and a <ChangeVolume> intent, where both the <PlayMucic> intent and the <Change Volume> intent correspond to a same music skill system. For further example, a pair of intents may include a <BookPlaneTicket> intent and a <GetWeather> intent, where the <BookPlaneTicket> intent corresponds to a booking skill system and the <GetWeather> intent corresponds to a weather skill system.

Intent pairings may additionally or alternatively be agnostic with respect to the 1P or 3P nature of the skill systems associated with the intents. That is, both of the intents of a pair may be associated with one or more 1P skill systems (e.g., skill systems operated as part of the supporting device(s) 120), both of the intents of a pair may be associated with one or more 3P skill systems (e.g., skill systems operated separately from but in communication with the supporting device(s) 120), or a first intent of a pair may be associated with a 1P skill system while the second intent of the pair is associated with a 3P skill system. For example, a pair of intents may include a <PlayMusic> intent and a <ChangeVolume> intent, where both the <PlayMusic> intent and the <Change Volume> intent are executed by a 1P skill system. For further example, a pair of intents may include a <PlayMusic> intent and a <ChangeVolume> intent, where both the <PlayMusic> intent and the <Change Volume> intent are executed by a 3P music skill system. For further example, a pair of intents may include a <BookPlaneTicket> intent and a <PlayMusic> intent, where the <BookPlaneTicket> intent is executed by a 3P skill system and the <PlayMusic> intent is executed by a 1P skill system.

Intent pair data may additionally or alternatively be user specific. For example, if a user routinely provides a natural language input, corresponding to a <ChangeVolume> intent, subsequent to providing a natural language input corresponding to a <PlayMusic> intent, the supporting device(s) 120 may increase the score associated with a pair of intents corresponding to these intents. Conversely, if the user rarely provides a natural language input, corresponding to a <ChangeVolume> intent, subsequent to providing a natural language input corresponding to a <PlayMusic> intent, the supporting device(s) 120 may decrease the score associated with a pair of intents correspond to these intents.

The supplemental content component 585 may additionally or alternatively base its determinations at least in part on data specific to the user 105 that provided the presently being processed natural language input. Each user may have a different tolerance regarding how many times supplemental content is output in a given period of time, what kinds of supplemental content are output, as well as how supplemental content is presented.

The supplemental content component 585 may receive user identity data 405 from the user recognition component 595. The user identity data 405 may indicate one or more users that likely provides the presently being processed natural language input. The supplemental content component 585 may thereafter query the profile storage 570 for user profile data 425 specific to the user that most likely provided the presently being processed natural language input.

The user profile data 425 may indicate a maximum number of times the user 105 has indicated the supporting device(s) 120 may output supplemental content in a specific period of time (e.g., twice/hour, ten (10) times/day, etc.). The maximum number of times may be irrespective to any specific skill system 525, entity and/or represented in the NLU results data 415, or the like. For example, the user profile data 425 may indicate the supporting device(s) 120 may output supplemental content a maximum of ten (10) times a day. If the supplemental content component 585 determines the supporting device(s) 120 has output supplemental content to the user 105 less than ten (10) times during a calendar day in which the present natural language input was received, the supplemental content component 585 may generate supplemental content data 445 indicating supplemental content should be output in conjunction with a response to the present natural language input. If the supplemental content component 585 determines the system has already output supplemental content to the user 105 ten (10) times during the calendar data in which the present natural language input was received, the supplemental content component 585 may not generate supplemental content data 445, thereby ending processing with respect to the output of supplemental content and thereby resulting in supplemental content not being output (in conjunction with content responsive to the present natural language input) by the supporting device(s) 120.

The user profile data 425 may additionally or alternatively indicate a user preference regarding how often (e.g., a frequency) supplemental content associated with a content type may be output in a specific amount of time. Additionally or alternatively, the user profile data 425 may indicate a user preference regarding how often supplemental content may be output in a specific amount of time with respect to a content type corresponding to a natural language input. Content types include, but are not limited to, songs, news information, videos, concert ticket offers, shopping discounts, and newly available skill systems. For example, a first user preference of a first user may indicate supplemental content corresponding to songs may be output up to ten (10) times a day, whereas a second user preference of a second user may indicate supplemental content corresponding to songs may be output up to two (2) times a week. For further example, a first user preference of a first user may indicate supplemental content may be output with regarding up to ten (10) natural language inputs corresponding to requests to play music in a single day whereas a second user preference of a second user may indicate supplemental content may be output regarding up to two (2) natural language inputs corresponding to requests to play music in a single a week.

The user profile data 425 may additionally or alternatively indicate a user preference regarding the times at which the user 105 permits the supporting device(s) 120 to output supplemental content. For example, a user preference may indicate the supporting device(s) 120 is permitted to output a first amount of supplemental content over the duration of a morning, and is permitted to output a second amount of supplemental content over the duration of an evening. The supplemental content component 585 may determine a time representing when the presently being processed natural language input was received (with such time be represented in, for example, the other data 435). If the supplemental content component 585 determines the supporting device(s)

120 has output supplemental content to the user 105 less times than permitted (as indicated by the user preference) for the time corresponding to receipt of the present natural language input, the supplemental content component 585 may generate supplemental content data 445. If the supplemental content component 585 determines the supporting device(s) 120 has already output supplemental content a number of permitted times (as indicated by the user preference) for the time corresponding to when the present natural language input was received, the supplemental content component 585 may not generate supplemental content data 445.

The user profile data 425 may additionally or alternatively indicate a user preference regarding the types of natural language inputs with respect to which the user 105 permits, as well as does not permit, the supporting device(s) 120 to output supplemental content. For example, the user preference may indicate the supporting device(s) 120 may output supplemental content when the natural language input corresponds to a request to play music. For further example, the user preference may indicate the supporting device(s) 120 may not output supplemental content when the natural language input corresponds to a request to purchase a product using a shopping skill system. If the supplemental content component 585 determines an intent (included in NLU results data 415 representing a present natural language input) corresponds to one with respect to which the supporting device(s) 120 is permitted (as indicated by the user preference) to output supplemental content, the supplemental content component 585 may generate supplemental content data 445. If the supplemental content component 585 determines an intent (included in NLU results data 415 representing a present natural language input) corresponds to one with respect to which the supporting device(s) 120 is not permitted (as indicated by the user preference) to output supplemental content, the supplemental content component 585 may not generate supplemental content data 445.

The user profile data 425 may additionally or alternatively indicate various characteristics of the user 105. The user profile data 425 may indicate an age of the user 105, as users of different ages may be receptive to receiving different amounts and/or kinds of supplemental content. The user profile data 425 may additionally or alternatively indicate a culture of the user 105, as users of different cultures may be receptive to receiving different amounts and/or kinds of supplemental content. The user profile data 425 may additionally or alternatively indicate a geographic region, country, or other geographic location corresponding to the user's residence, as users residing in different geographic locations may be receptive to receiving different amounts and/or kinds of supplemental content. If the supplemental content component 585 determines the characteristic(s) of the user 105 indicates supplemental content should be output, the supplemental content component 585 may generate supplemental content data 445. If the supplemental content component 585 determines the characteristic(s) of the user 105 indicates supplemental content should not be output, the supplemental content component 585 may not generate supplemental content data 445.

The user profile data 425 may additionally or alternatively indicate a user preference regarding entities, represented in NLU results data 415, with respect to which supplemental content may be output. For example, a user preference may indicate the supporting device(s) 120 may output supplemental content when the NLU results data 415 includes an entity corresponding to a particular sports team. For further example, a user preference may indicate the supporting device(s) 120 may not output supplemental content when the NLU results data 415 includes an entity corresponding to a celebrity. If the supplemental content component 585 determines at least one entity, represented in the NLU results data 415, corresponds to an entity with respect to which a user preference indicates supplemental content may be output, the supplemental content component 585 may generate supplemental content data 445. If the supplemental content component 585 determines at least one entity, represented in the NLU results data 415, corresponds to an entity with respect to which a user preference indicates supplemental content should not be output, the supplemental content component 585 may not generate supplemental content data 445.

The other data 435 may indicate a region, country, or other geographic location of the natural language input originating-device 110, as users interacting with devices 110 located in different geographic locations may be receptive to receiving different amounts and/or kinds of supplemental content. If the supplemental content component 585 determines the geographic location of the natural language input-originating device 110 indicates supplemental content may be output, the supplemental content component 585 may generate supplemental content data 445. If the supplemental content component 585 determines the geographic location of the natural language input-originating device 110 indicates supplemental content should not be output, the supplemental content component 585 may not generate supplemental content data 445.

The other data 435 may additionally or alternatively include information representing the natural language input originating-user's system usage history. The user's system usage history may represent instances of previous input natural language inputs, ASR results data, NLU results data, as well as other processing results data. The supplemental content component 585 may determine one or more trends in the natural language input originating-user's system usage history. For example, the supplemental content component 585 may determine the user 105 routinely provides a natural language input, requesting output of weather information for a location, immediately following output of content responsive to a natural language input requesting a flight be booked to the location. The supplemental content component 585 may additionally or alternatively determine whether a current context (e.g., ASR results data representing the current natural language input, NLU results representing the current natural language input, etc.) correspond to any of the determined trends. If the supplemental content component 585 determines the current context corresponds to at least one trend, the supplemental content component 585 may generate supplemental content data 445.

The other data 435 may additionally or alternatively represent previously provided user feedback indicating the appropriateness of previously output supplemental content. The other data 435 may additionally or alternatively include social media data associated with the user, system usage history associated with the user, a history of music listened to by the user, a history of books purchased by the user, a general purchasing history of the user, a browsing history of the user, a travel history of the user, information from the user's electronic calendar, etc.

The supplemental content component 585 may also receive personalization metric(s) 402 from the personalization metric storage 155. As described herein, the personalization metric(s) 402 may be one or more personalization metrics, determined by the personalization metric generator 150, and corresponding to a user 105 and/or a system aspect. The supplemental content component 585 may use the personalization metric(s) 402 to select, determine and/or rank pieces of supplemental content, which may be included in the supplemental content data 445.

The supplemental content component 585 may run one or more machine learned models that may take as input one or more of the data/information detailed above, and determine whether supplemental content should be output (e.g., determine whether supplemental content data 445 should be generated). The model(s) run by the supplemental content component 585 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the supplemental content component 585, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The model(s) run by the supplemental content component 585 may include skill system-specific rules. Thus, if the NLU results data 415 is associated with a specific skill system, the model(s) may execute skill system-specific rules that are associated with the skill system to which the NLU results data 415 is associated. For example, the model(s) may include music skill system-specific rules that indicate supplemental content should never be output when the music skill system is represented in NLU results data 415 since the output of the music skill system is long form music content.

In examples where a single model having skill system-specific portions is implemented, a portion of the model(s) specific to one or more skill systems may be considered static because the portion may remain constant overtime.

The model(s) run by the supplemental content component 585 may additionally or alternatively be personalized to the natural language input-originating user, at runtime. That is, the model(s) may be trained to consider a variety of information and, at runtime, the supplemental content component 585 may run the model(s) with respect to a variety of information specific to the natural language input-originating user 105.

A user may provide the supporting device(s) 120 with feedback regarding the appropriateness of output supplemental content. Such feedback may be positive or negative. Moreover, a user may provide feedback to the supporting device(s) 120 by speaking the feedback to the device 110a, by interacting with a touchscreen of the device 110b, by performing a gesture (e.g., thumbs up, thumbs down, etc.) that is captured by a camera of the device (110a/110b), etc. The supporting device(s) 120 may train or retrain the model(s), implemented by the supplemental content component 585, using the provided feedback so the supplemental content component 585 does not determine supplemental content should be output if the current context corresponds to a previous instance where the provided feedback indicated the supplemental content was not applicable to the user or otherwise inappropriate/unnecessary from the user's perspective.

The supplemental content component 585 may compile all applicable other data 435 and user preferences, represented as the user profile data 425 in FIG. 4, into a multi-dimensional feature vector. The supplemental content component 585 may impose a feature vector dimension threshold to determine whether to run the machine learned model(s) or to use default rules with respect to when supplemental content should be output. It will be appreciated that the more user-specific dimensions a feature vector has, the more user specific the output of the model(s) may be. It will also be appreciated that running a model(s) may be operationally intensive. Thus, the feature vector dimension threshold may be configured at a value representing a diminishing return of user-specific model(s) output. That is, if the multi-dimensional feature vector includes a number of dimensions not satisfying (e.g., falling below) the feature vector dimension threshold, the reliability of a user-specific model(s) output based on the multi-dimensional feature vector does not outweigh the operational intensity of running the model(s).

The default rules for determining when supplemental content should be output may be configured with respect to a default user. For example, the default rules may be based on the culture of a default user, the geographic location (e.g., country, region, etc.) of a default user, the maximum number of times a default user would permit the supporting device(s) 120 to output supplemental content in a specific period of time, etc.

The supplemental content component 585 may generate and output supplemental content data 445 indicating supplemental content should be output. The supplemental content component 585 may send the supplemental content data 445 to a skill system 525a configured to determine supplemental content associated with but not directly responsive to the current natural language input. The supplemental content data 445 may include at least a portion of the NLU results data 415, and optionally at least a portion of the user profile data 425 and/or at least a portion of the other data 435.

The supplemental content data 445 may indicate a specific skill system 525 that should be queried for supplemental content. As described above, a skill system 525 may provide the supporting device(s) 120 with data indicating that any time the NLU results data 415 indicate a particular intent, the supplemental content component 585 should query the skill system 525 as to whether the skill system 525 has supplemental content that may be output. When the supplemental content component 585 determines the NLU results data 415 indicate the particular intent, the supplemental content data 445 may include an indication that the supplemental content skill system 525a should query the specific skill system 525 for supplemental content associated with one or more entities represented in the NLU results data 415.

The supplemental content skill system 525a may determine a content provider 430 from which to receive supplemental content from based at least in part on the NLU results data 415. For example, the supplemental content skill system 525a may determine the NLU results data 415 includes a <PlayMusic> intent and "Adele" as an entity. Based thereon, the supplemental content skill system 525a may determine a concert booking content provider 430 from which to receive supplemental content from.

The supplemental content skill system 525a (or, alternatively for example, the orchestrator component 530) may send, to the content provider 430, a request 455 for supplemental content. In at least some examples, the request 455 may indicate at least a portion of the entities represented in the NLU results data 415 that the content provider 430 may use to determine supplemental content. The supporting device(s) 120, in at least some examples, may determine first output data, responsive to the natural language input, prior to determining the content provider 430 from which to receive supplemental content. Alternatively, the supporting device(s) 120 may determine the content provider 430, from which to receive supplemental content, after determining the NLU results data 415 but prior to determining the first output data.

The content provider 430 may provide the supplemental content skill system 525a with supplemental content 465 associated with but not directly responsive to the natural language input. In at least some examples, the content provider 430 may be unable to determine supplemental content. In such examples, the content provider 430 may provide the supplemental content skill system 525a with an indication of such.

The supplemental content data 445 may, in at least some examples, indicate a modality that supplemental content should be output in. The modality may be represented in the user profile data 425 input to the supplemental content component 585. For example, the user profile data 425 may indicate a user preference indicating that the user 105 prefers the supporting device(s) 120 to output unresponsive visual content over unresponsive audio content. In such a case, the request 455 may include a request for image data or video data if such can be obtained or generated by the content provider 430.

The supplemental content component 585 may determine whether supplemental content should be output while content, responsive to a natural language input, is output by the supporting device(s) 120. For example, a device 110 may receive a natural language input to cease output of content responsive to a natural language input while the content is be output. For example, while a song is being output, a user may say "Alexa, cancel." The device 110 may send input data, representing the user's cease output natural language input, to the supporting device(s) 120. The supporting device(s) 120 may process the input data (e.g., by performing ASR processing and NLU processing) to determine an intent to cease output of the content. The supplemental content component 585 may thereafter determine supplemental content should not be output based at least in part on the intent to cease output of the original content.

The device 110 may alternatively receive a natural language input to decrease output of supplemental content while content, responsive to a natural language input, is being output. For example, while plane ticket booking information is being output, a user may say "Alexa, only output supplemental content 3 times a week." The supporting device(s) 120 may process the input data to determine an intent to decrease or otherwise alter a frequency at which supplemental content should be output. The supplemental content component 585 may therefrom determine a frequency at which supplemental content was output prior to receiving the current natural language input. If the frequency at which supplemental content was output is equal to or greater than the decreased or otherwise altered frequency, the supplemental content component 585 may determine not to output supplemental content. If the frequency at which supplemental content was output is less than the decreased or otherwise altered frequency, the supplemental content component 585 may determine to output supplemental content using the teachings disclosed herein.

It will be appreciated that, with respect to any single natural language input, the supplemental content skill system 525a may send a request 455 to more than one content provider 430. The supplemental content skill system 525a may send all supplemental content, received from the one or more queried content providers 430, to the supplemental content component 585. Each portion of supplemental content, sent to the supplemental content component 585, may be associated with a content provider identifier corresponding to the content provider 430 that provided the portion of supplemental content.

Referring to FIG. 5, the user device 110 may receive audio 107 corresponding to a spoken natural language input originating from the user 105 (e.g., the user device 110a may receive audio 107a corresponding to a spoken natural language input originated from the user 105a, etc.). The user device 110 may generate audio data corresponding to the audio 107, and may send the audio data to the supporting device(s) 120 for further processing. The user device 110 may send the audio data to the supporting device(s) 120 via an application that is installed on the user device 110 and associated with the supporting device(s) 120 (i.e., through which the user device 110 sends data to and receives data from the supporting device(s) 120). An example of such an application is the Amazon Alexa application that may be installed on a smart phone, tablet, or the like. In some implementations, the user device 110 may receive typed text corresponding to a natural language input originating from the user 105, and send text data (corresponding to the typed text) to the supporting device(s) 120. The user device 110 may also receive output data from the supporting device(s) 120, and generate a synthesized speech output. The user device 110 may include a camera for capturing image and/or video data for processing by the supporting device(s) 120. Examples of various user devices 110 are further illustrated in FIG. 9. The supporting device(s) 120 may be a remote system, such as a group of computing components located geographically remote from the user device 110 but accessible via the network(s) 199 (for example, servers accessible via the internet). The supporting device(s) 120 may also include a remote system that is physically separate from the user device 110 but located geographically close to the user device 110 and accessible via the network(s) 199 (for example a home server located in a same residence as the user device 110). The supporting device(s) 120 may also include some combination thereof, for example where certain components/operations are performed via a home server(s) and others are performed via a geographically remote server(s).

The system 100 may operate using various components as described in FIG. 5. The various components may be located on same or different physical devices. Communication between various components may occur directly or across a network(s) 199. The device 110 may include audio capture component(s), such as a microphone or array of microphones of a device 110, captures audio 107 and creates corresponding audio data. Once speech is detected in audio data representing the audio 107, the device 110 may determine if the speech is directed at the device 110/supporting device 120. In at least some embodiments, such determination may be made using a wakeword detection component 520. The wakeword detection component 520 may be configured to detect various wakewords. In at least some examples, each wakeword may correspond to a name of a different digital assistant. An example wakeword/digital assistant name is "Alexa." In another example, input to the system may be in form of text data 513, for example as a result of a user typing an input into a user interface of device 110. Other input forms may include indication that the user has pressed a physical or virtual button on device 110, the user has made a gesture, etc. The device 110 may also capture images using camera(s) 818 of the device 110 and may send image data representing those image(s) to the supporting device 120. The image data may include raw image data or image data processed by the device 110 before sending to the supporting device 120. The image data may be used in various manners by different components of the system to perform operations such as determining whether a user is directing an utterance to the system, interpreting a user command, responding to a user command, etc.

The wakeword detector 520 of the device 110 may process the audio data, representing the audio 107, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 107, is analyzed to determine if specific characteristics of the audio data match preconfigured acoustic waveforms, audio signatures, or other data corresponding to a wakeword.

Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 520 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 520 and/or input is detected by an input detector, the device 110 may "wake" and begin transmitting audio data 511, representing the audio 107, to the supporting device(s) 120. The audio data 511 may include data corresponding to the wakeword; in other embodiments, the portion of the audio corresponding to the wakeword is removed by the device 110 prior to sending the audio data 511 to the supporting device(s) 120. In the case of touch input detection or gesture based input detection, the audio data may not include a wakeword.

In some implementations, the system 100 may include more than one supporting device 120. The supporting devices 120 may respond to different wakewords and/or perform different categories of tasks. Each supporting device 120 may be associated with its own wakeword such that speaking a certain wakeword results in audio data be sent to and processed by a particular system. For example, detection of the wakeword "Alexa" by the wakeword detector 520 may result in sending audio data to supporting device 120a for processing while detection of the wakeword "Computer" by the wakeword detector may result in sending audio data to supporting device 120b for processing. The system may have a separate wakeword and system for different skills/systems (e.g., "Dungeon Master" for a game play skill/supporting device 120c) and/or such skills/systems may be coordinated by one or more skill(s) 590 of one or more supporting devices 120.

Upon receipt by the supporting device(s) 120, the audio data 511 may be sent to an orchestrator component 530. The orchestrator component 530 may include memory and logic that enables the orchestrator component 530 to transmit various pieces and forms of data to various components of the system, as well as perform other operations as described herein.

The orchestrator component 530 may send the audio data 511 to a language processing component 592. The language processing component 592 (sometimes also referred to as a spoken language understanding (SLU) component) includes an automatic speech recognition (ASR) component 550 and a natural language understanding (NLU) component 560. The ASR component 550 may transcribe the audio data 511 into text data. The text data output by the ASR component 550 represents one or more than one (e.g., in the form of an N-best list) ASR hypotheses representing speech represented in the audio data 511. The ASR component 550 interprets the speech in the audio data 511 based on a similarity between the audio data 511 and pre-established language models. For example, the ASR component 550 may compare the audio data 511 with models for sounds (e.g., acoustic units such as phonemes, senons, phones, etc.) and sequences of sounds to identify words that match the sequence of sounds of the speech represented in the audio data 511. The ASR component 550 sends the text data generated thereby to an NLU component 560, via, in some embodiments, the orchestrator component 530. The text data sent from the ASR component 550 to the NLU component 560 may include a single top-scoring ASR hypothesis or may include an N-best list including multiple top-scoring ASR hypotheses. An N-best list may additionally include a respective score associated with each ASR hypothesis represented therein.

The speech processing system 592 may further include a NLU component 560. The NLU component 560 may receive the text data from the ASR component. The NLU component 560 may attempts to make a semantic interpretation of the phrase(s) or statement(s) represented in the text data input therein by determining one or more meanings associated with the phrase(s) or statement(s) represented in the text data. The NLU component 560 may determine an intent representing an action that a user desires be performed and may determine information that allows a device (e.g., the device 110, the supporting device(s) 120, a skill component 590, a skill system(s) 525, etc.) to execute the intent. For example, if the text data corresponds to "play the $5^{th}$ Symphony by Beethoven," the NLU component 560 may determine an intent that the system output music and may identify "Beethoven" as an artist/composer and "5th Symphony" as the piece of music to be played. For further example, if the text data corresponds to "what is the weather," the NLU component 560 may determine an intent that the system output weather information associated with a geographic location of the device 110. In another example, if the text data corresponds to "turn off the lights," the NLU component 560 may determine an intent that the system turn off lights associated with the device 110 or the user 105. However, if the NLU component 560 is unable to resolve the entity—for example, because the entity is referred to by anaphora such as "this song" or "my next appointment"—the speech processing system 592 can send a decode request to another speech processing system 592 for information regarding the entity mention and/or other context related to the utterance. The speech processing system 592 may augment, correct, or base results data upon the audio data 511 as well as any data received from the other speech processing system 592.

The NLU component 560 may return NLU results data (which may include tagged text data, indicators of intent, etc.) back to the orchestrator 530. The orchestrator 530 may forward the NLU results data to a skill component(s) 590. If the NLU results data includes a single NLU hypothesis, the NLU component 560 and the orchestrator component 530 may direct the NLU results data to the skill component(s) 590 associated with the NLU hypothesis. If the NLU results data 1085/1025 includes an N-best list of NLU hypotheses, the NLU component 560 and the orchestrator component 530 may direct the top scoring NLU hypothesis to a skill component(s) 590 associated with the top scoring NLU hypothesis. The system may also include a post-NLU ranker 565 which may incorporate other information to rank potential interpretations determined by the NLU component 560. The local device 110 may also include its own post-NLU ranker 565, which may operate similarly to the post-NLU ranker 565.

A skill component may be software running on the supporting device(s) 120 that is akin to a software application. That is, a skill component 590 may enable the supporting device(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The supporting device(s) 120 may be configured with more than one skill component 590. For example, a weather service skill component may enable the supporting device(s) 120 to provide weather information, a car service skill component may enable the supporting device(s) 120 to book a trip with respect to a taxi or ride sharing service, a restaurant skill component may enable the supporting device(s) 120 to order a pizza with respect to the restaurant's online ordering system, etc. A skill component 590 may operate in conjunction between the supporting device(s) 120 and other devices, such as the device 110, in order to complete certain functions. Inputs to a skill component 590 may come from speech processing interactions or through other interactions or input sources. A skill component 590 may include hardware, software, firmware, or the like that may be dedicated to a particular skill component 590 or shared among different skill components 590.

A skill support system(s) 525 may communicate with a skill component(s) 590 within the supporting device(s) 120 and/or directly with the orchestrator component 530 or with other components. A skill support system(s) 525 may be configured to perform one or more actions. An ability to perform such action(s) may sometimes be referred to as a "skill." That is, a skill may enable a skill support system(s) 525 to execute specific functionality in order to provide data or perform some other action requested by a user. For example, a weather service skill may enable a skill support system(s) 525 to provide weather information to the supporting device(s) 120, a car service skill may enable a skill support system(s) 525 to book a trip with respect to a taxi or ride sharing service, an order pizza skill may enable a skill support system(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The supporting device(s) 120 may be configured with a skill component 590 dedicated to interacting with the skill support system(s) 525. Unless expressly stated otherwise, reference to a skill, skill device, or skill component may include a skill component 590 operated by the supporting device(s) 120 and/or skill operated by the skill support system(s) 525. Moreover, the functionality described herein as a skill or skill may be referred to using many different terms, such as an action, bot, app, or the like. The skill 590 and or skill support system(s) 525 may return output data to the orchestrator 530.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The supporting device 120 includes a language output component 593. The language output component 593 includes a natural language generation (NLG) component 579 and a text-to-speech (TTS) component 580. The NLG component 579 can generate text for purposes of TTS output to a user. For example the NLG component 579 may generate text corresponding to instructions corresponding to a particular action for the user to perform. The NLG component 579 may generate appropriate text for various outputs as described herein. The NLG component 579 may include one or more trained models configured to output text appropriate for a particular input. The text output by the NLG component 579 may become input for the TTS component 580 (e.g., output text data discussed below). Alternatively or in addition, the TTS component 580 may receive text data from a skill 590 or other system component for output.

The NLG component 579 may include a trained model. The NLG component 579 generates text data such that the output text data has a natural feel and, in some embodiments, includes words and/or phrases specifically formatted for a requesting individual. The NLG component 579 may use templates to formulate responses. The NLG component 579 may include models trained from the various templates for forming the output text data. For example, the NLG component 579 may analyze transcripts of local news programs, television shows, sporting events, or any other media program to obtain common components of a relevant language and/or region. As one illustrative example, the NLG component 579 may analyze a transcription of a regional sports program to determine commonly used words or phrases for describing scores or other sporting news for a particular region. The NLG component 579 may further receive, as inputs, a dialog history, an indicator of a level of formality, and/or a command history or other user history such as the dialog history.

The NLG component 579 may generate dialog data based on one or more response templates. Further continuing the example above, the NLG component 579 may select a template in response to the question, "What is the weather currently like?" of the form: "The weather currently is $weather_information$." The NLG component 579 may analyze the logical form of the template to produce one or more textual responses including markups and annotations to familiarize the response that is generated. In some embodiments, the NLG component 579 may determine which response is the most appropriate response to be selected. The selection may, therefore, be based on past responses, past questions, a level of formality, and/or any other feature, or any other combination thereof. Responsive audio data representing the response generated by the NLG component 579 may then be generated using the text-to-speech component 580.

The TTS component 580 may generate audio data (e.g., synthesized speech) from text data using one or more different methods. Text data input to the TTS component 580 may come from a skill component 590, the orchestrator component 530, or another component of the system. In one method of synthesis called unit selection, the TTS component 580 matches text data against a database of recorded speech. The TTS component 580 selects matching units of recorded speech and concatenates the units together to form audio data. In another method of synthesis called parametric synthesis, the TTS component 580 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the supporting device(s) 120 as image data. The device 110 may further include circuitry for voice command-based control of the camera, allowing a user 105 to request capture of image or video data. The device 110 may process the commands locally or send audio data 511 representing the commands to the supporting device(s) 120 for processing, after which the supporting device(s) 120 may return output data that can cause the device 110 to engage its camera.

Upon receipt by the supporting device(s) 120, the image data may be sent to an orchestrator component 530. The orchestrator component 530 may send the image data to an image processing component. The image processing component can perform computer vision functions such as object recognition, modeling, reconstruction, etc. For example, the image processing component may detect a person, face, etc. (which may then be identified using user recognition component 595).

In some implementations, the image processing component can detect the presence of text in an image. In such implementations, the image processing component can recognize the presence of text, convert the image data to text data, and send the resulting text data via the orchestrator component 530 to the language processing component 592 for processing by the NLU component 560.

The supporting device(s) 120 may include a user recognition component 595 that recognizes one or more users using a variety of data. However, the disclosure is not limited thereto, and the user device 110 may include a user recognition component 695 instead of and/or in addition to user recognition component 595 of the supporting device(s) 120 without departing from the disclosure. User recognition component 695 operates similarly to user recognition component 595.

The user-recognition component 595 may take as input the audio data 511 and/or text data output by the ASR component 550. The user-recognition component 595 may perform user recognition by comparing audio characteristics in the audio data 511 to stored audio characteristics of users. The user-recognition component 595 may also perform user recognition by comparing biometric data (e.g., fingerprint data, iris data, etc.), received by the system in correlation with the present user input, to stored biometric data of users assuming user permission and previous authorization. The user-recognition component 595 may further perform user recognition by comparing image data (e.g., including a representation of at least a feature of a user), received by the system in correlation with the present user input, with stored image data including representations of features of different users. The user-recognition component 595 may perform additional user recognition processes, including those known in the art.

The user-recognition component 595 determines scores indicating whether user input originated from a particular user. For example, a first score may indicate a likelihood that the user input originated from a first user, a second score may indicate a likelihood that the user input originated from a second user, etc. The user-recognition component 595 also determines an overall confidence regarding the accuracy of user recognition operations.

Output of the user-recognition component 595 may include a single user identifier corresponding to the most likely user that originated the user input. Alternatively, output of the user-recognition component 595 may include an N-best list of user identifiers with respective scores indicating likelihoods of respective users originating the user input. The output of the user-recognition component 595 may be used to inform NLU processing as well as processing performed by other components of the system.

The system 100 (either on device 110, supporting device 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the supporting device 120 with permission to allow the skill to execute with respect to the user's natural language user inputs. If a user does not enable a skill, the supporting device 120 may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 6:
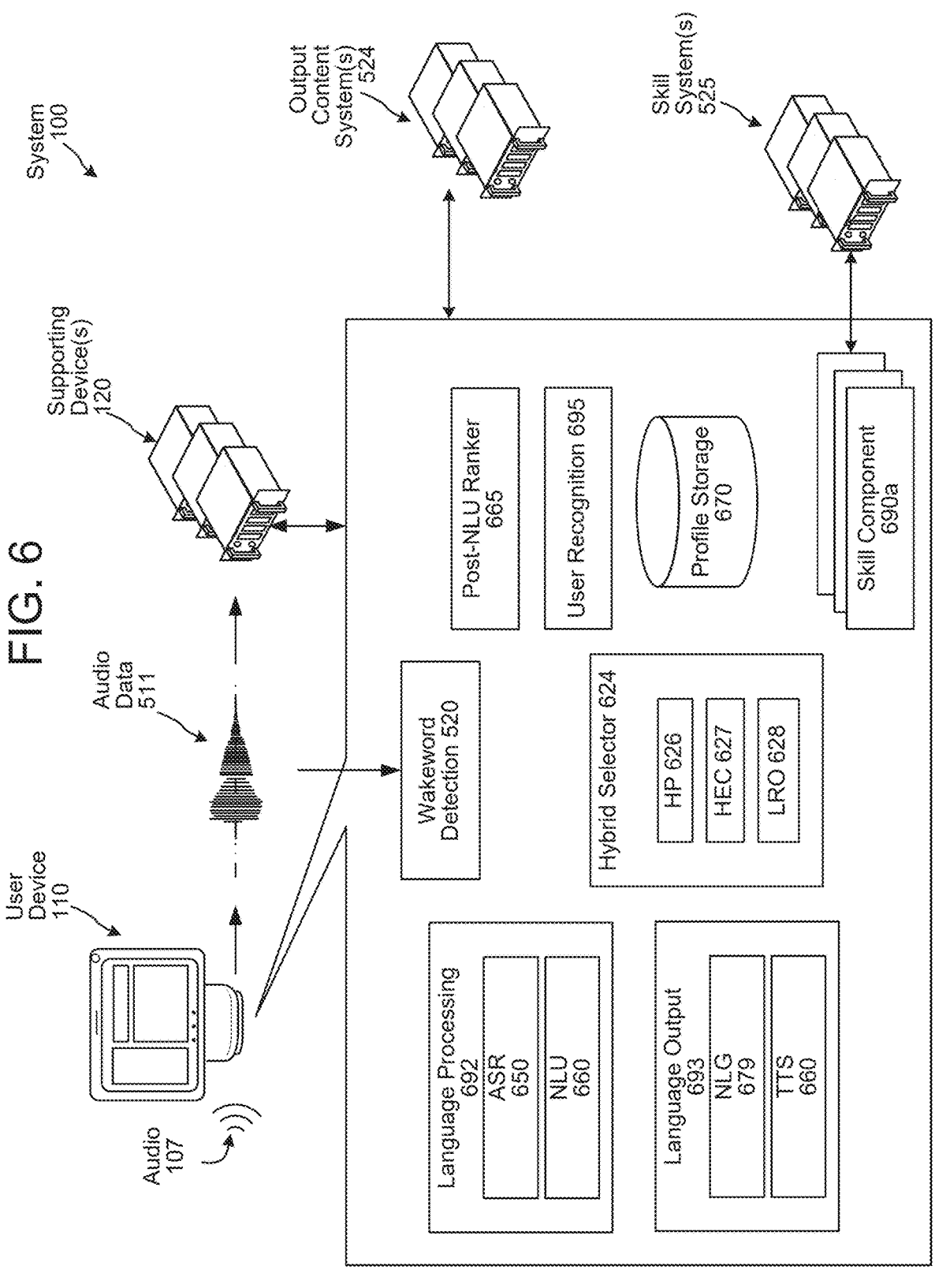
FIG. 6 is a conceptual diagram illustrating components that may be included in a device, according to embodiments of the present disclosure.

In some embodiments, the supporting device(s) 120 and/or the user device 110 (as shown in FIG. 6) may be in communication with an output content system(s) 524. The output content system(s) 524 may store data representing content that is provided to the user devices 110 for presentation; for example the data may be a content identifier, a link to access the content, content title, etc. The output content system(s) 524 may also store data corresponding to output of the content, such as device identifier for the user device 110, profile identifier for the user profile of the user 105, time when the content is provided to the user device 110, time when a user 105 interacts with the content, component (e.g., a skill component 590, the supplemental content component 585, etc.) that determined the content for presentation, the output modality for presenting the content (e.g., synthesized speech, displayed output, notification output, etc.). The data corresponding to the content may be sent to the output content system(s) 524 by the orchestrator component 530 after (or in parallel) the content is sent to the user device 110 for presentation. In other embodiments, the data corresponding to the content may be sent to the output content system(s) 524 by the skill component 590, the skill system(s) 525, the supplemental content component 585, etc. In other embodiments, the data corresponding to the content may be sent to the output content system(s) 524 by the user device 110. In some embodiments, the output content storage 140 (shown in FIGS. 1A and 1B) may be in communication with or may be included in the output content system(s) 524.

Although the components of FIG. 5 may be illustrated as part of supporting device(s) 120, device 110, or otherwise, the components may be arranged in other device(s) (such as in device 110 if illustrated in supporting device(s) 120 or vice-versa, or in other device(s) altogether) without departing from the disclosure. FIG. 6 illustrates such a configured device 110.

In at least some embodiments, the supporting device 120 may receive the audio data 511 from the device 110, to recognize speech corresponding to a spoken input in the received audio data 511, and to perform functions in response to the recognized speech. In at least some embodiments, these functions involve sending directives (e.g., commands), from the supporting device 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the supporting device 120 over the network(s) 199, some or all of the functions capable of being performed by the supporting device 120 may be performed by sending one or more directives over the network(s) 199 to the device 110, which, in turn, may process the directive(s) and perform one or more corresponding actions. For example, the supporting device 120, using a remote directive that is included in response data (e.g., a remote response), may instruct the device 110 to output an audible response (e.g., using TTS processing performed by an on-device TTS component 680) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the supporting device 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 5, the device 110 may include a wakeword detection component 520 configured to compare the audio data 511 to stored models used to detect a wakeword (e.g., "Alexa") that indicates to the device 110 that the audio data 511 is to be processed for determining NLU output data (e.g., slot data that corresponds to a named entity, label data, and/or intent data, etc.). In at least some embodiments, a hybrid selector 624, of the device 110, may send the audio data 511 to the wakeword detection component 520. If the wakeword detection component 520 detects a wakeword in the audio data 511, the wakeword detection component 520 may send an indication of such detection to the hybrid selector 624. In response to receiving the indication, the hybrid selector 624 may send the audio data 511 to the supporting device 120 and/or the ASR component 650. The wakeword detection component 520 may also send an indication, to the hybrid selector 624, representing a wakeword was not detected. In response to receiving such an indication, the hybrid selector 624 may refrain from sending the audio data 511 to the supporting device 120, and may prevent the ASR component 650 from further processing the audio data 511. In this situation, the audio data 511 can be discarded.

The device 110 may conduct its own speech processing using on-device language processing components, such as an SLU/language processing component 692 (which may include an ASR component 650 and an NLU 660), similar to the manner discussed herein with respect to the SLU component 592 (or ASR component 550 and the NLU component 560) of the supporting device 120. Language processing component 692 may operate similarly to language processing component 592, ASR component 650 may operate similarly to ASR component 550 and NLU component 660 may operate similarly to NLU component 560. The device 110 may also internally include, or otherwise have access to, other components such as a post-NLU ranker 665 (which may operate similarly to the post-NLU ranker 565), one or more skill components 690 capable of executing commands based on NLU output data or other results determined by the device 110/supporting device 120 (which may operate similarly to skill components 590), a user recognition component 695 (configured to process in a similar manner to that discussed herein with respect to the user recognition component 595 of the supporting device 120), profile storage 670 (configured to store similar profile data to that discussed herein with respect to the profile storage 570 of the supporting device 120), or other components. In at least some embodiments, the profile storage 670 may only store profile data for a user or group of users specifically associated with the device 110. Similar to as described above with respect to skill component 590, a skill component 690 may communicate with a skill system(s) 525. The device 110 may also have its own language output component 693 which may include NLG component 679 and TTS component 680. Language output component 693 may operate similarly to language processing component 593, NLG component 679 may operate similarly to NLG component 579 and TTS component 680 may operate similarly to TTS component 580.

In at least some embodiments, the on-device language processing components may not have the same capabilities as the language processing components of the supporting device 120. For example, the on-device language processing components may be configured to handle only a subset of the natural language user inputs that may be handled by the supporting device 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the supporting device 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the supporting device 120.

The hybrid selector 624, of the device 110, may include a hybrid proxy (HP) 626 configured to proxy traffic to/from the supporting device 120. For example, the HIP 626 may be configured to send messages to/from a hybrid execution controller (HEC) 627 of the hybrid selector 624. For example, command/directive data received from the supporting device 120 can be sent to the HEC 627 using the HP 626. The HP 626 may also be configured to allow the audio data 511 to pass to the supporting device 120 while also receiving (e.g., intercepting) this audio data 511 and sending the audio data 511 to the HEC 627.

In at least some embodiments, the hybrid selector 624 may further include a local request orchestrator (LRO) 628 configured to notify the ASR component 650 about the availability of new audio data 511 that represents user speech, and to otherwise initiate the operations of local language processing when new audio data 511 becomes available. In general, the hybrid selector 624 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the supporting device 120 and chooses to use that remotely-determined directive data.

Thus, when the audio data 511 is received, the HP 626 may allow the audio data 511 to pass through to the supporting device 120 and the HP 626 may also input the audio data 511 to the on-device ASR component 650 by routing the audio data 511 through the HEC 627 of the hybrid selector 624, whereby the LRO 628 notifies the ASR component 650 of the audio data 511. At this point, the hybrid selector 624 may wait for response data from either or both of the supporting device 120 or the local language processing components. However, the disclosure is not limited thereto, and in some examples the hybrid selector 624 may send the audio data 511 only to the local ASR component 650 without departing from the disclosure. For example, the device 110 may process the audio data 511 locally without sending the audio data 511 to the supporting device 120.

The local ASR component 650 is configured to receive the audio data 511 from the hybrid selector 624, and to recognize speech in the audio data 511, and the local NLU component 660 is configured to determine a user intent from the recognized speech, and to determine how to act on the user intent by generating NLU output data which may include directive data (e.g., instructing a component to perform an action). Such NLU output data may take a form similar to that as determined by the NLU component 560 of the supporting device 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 660) may be selected as usable to respond to a natural language user input, and local response data may be sent (e.g., local NLU output data, local knowledge base information, internet search results, and/or local directive data) to the hybrid selector 624, such as a "ReadyToExecute" response. The hybrid selector 624 may then determine whether to use directive data from the on-device components to respond to the natural language user input, to use directive data received from the supporting device 120, assuming a remote response is even received (e.g., when the device 110 is able to access the supporting device 120 over the network(s) 199), or to determine output audio requesting additional information from the user 105.

The device 110 and/or the supporting device 120 may associate a unique identifier with each natural language user input. The device 110 may include the unique identifier when sending the audio data 511 to the supporting device 120, and the response data from the supporting device 120 may include the unique identifier to identify which natural language user input the response data corresponds.

In at least some embodiments, the device 110 may include, or be configured to use, one or more skill components 690 that may work similarly to the skill component(s) 590 implemented by the supporting device 120. The skill component(s) 690 may correspond to one or more domains that are used in order to determine how to act on a spoken input in a particular way, such as by outputting a directive that corresponds to the determined intent, and which can be processed to implement the desired operation. The skill component(s) 690 installed on the device 110 may include, without limitation, a smart home skill component (or smart home domain) and/or a device control skill component (or device control domain) to execute in response to spoken inputs corresponding to an intent to control a second device (s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 525. For example, a skill system 525 may be located in a remote environment (e.g., separate location) such that the device 110 may only communicate with the skill system 525 via the network(s) 199. However, the disclosure is not limited thereto. For example, in at least some embodiments, a skill system 525 may be configured in a local environment (e.g., home server and/or the like) such that the device 110 may communicate with the skill system 525 via a private network, such as a local area network (LAN).

As used herein, a "skill" may refer to a skill component 690, a skill system 525, or a combination of a skill component 690 and a corresponding skill system 525.

Similar to the manner discussed with regard to FIG. 7, the local device 110 may be configured to recognize multiple different wakewords and/or perform different categories of tasks depending on the wakeword. Such different wakewords may invoke different processing components of local device 110 (not illustrated in FIG. 6). For example, detection of the wakeword "Alexa" by the wakeword detector 720 may result in sending audio data to certain language processing components 692/skills 690 for processing while detection of the wakeword "Computer" by the wakeword detector may result in sending different audio data by the language processing components 692/skills 690 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 7 is a block diagram conceptually illustrating a device 110 that may be used with the system. FIG. 8 is a block diagram conceptually illustrating example components of a system, such as the supporting device(s) 120, which may assist with ASR processing, NLU processing, etc., and a skill system 525. A system (120/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/supporting device 120 may be located remotely from the device 110 as its operations may not require proximity to the user. The server/supporting device 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/supporting device 120 being in a user's home/business is that data used to process a command/return a response may be kept within the user's home, thus reducing potential privacy concerns.

Multiple systems (120/525) may be included in the overall system 100 of the present disclosure, such as one or more supporting devices 120 for performing ASR processing, one or more supporting devices 120 for performing NLU processing, one or more skill systems 525, etc. In operation, each of these systems may include computer-readable and computer-executable instructions that reside on the respective device (120/525), as will be discussed further below.

Each of these devices (110/120/525) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/525) may also include a data storage component (708/808) for storing data and controller/processor-executable instructions. Each data storage component (708/808) may individually include one or more non-volatile storage types such as magnetic storage, optical storage, solid-state storage, etc. Each device (110/120/525) may also be connected to removable or external non-volatile memory and/or storage (such as a removable memory card, memory key drive, networked storage, etc.) through respective input/output device interfaces (702/802).

Computer instructions for operating each device (110/120/525) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/525) includes input/output device interfaces (702/802). A variety of components may be connected through the input/output device interfaces (702/802), as will be discussed further below. Additionally, each device (110/120/525) may include an address/data bus (724/824) for conveying data among components of the respective device. Each component within a device (110/120/525) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 722, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the user device(s) 110, the supporting device 120, or a skill system 525 may include their own dedicated processors, memory, and/or storage. Alternatively, one or more of the components of the device(s) 110, the supporting device 120, or a skill system 525 may utilize the I/O interfaces (702/802), processor(s) (704/804), memory (706/806), and/or storage (708/808) of the device(s) 110, supporting device(s) 120, or the skill system 525, respectively. Thus, the ASR component 550 may have its own I/O interface(s), processor(s), memory, and/or storage; the NLU component 560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the supporting device(s) 120, and a skill system 525, as described herein, are illustrative, and may be located as a stand-alone device or may be included, in whole or in part, as a component of a larger device or system. As can be appreciated, a number of components may exist either on a supporting device 120 and/or on device 110. For example, language processing component 592/692 (which may include ASR component 550/650), language output component 593/693 (which may include NLG component 579/679 and TTS component 580/680), etc., for example as illustrated in FIGS. 5 and 6. Unless expressly noted otherwise, the system version of such components may operate similarly to the device version of such components and thus the description of one version (e.g., the system version or the local version) applies to the description of the other version (e.g., the local version or system version) and vice-versa.

Figure 9:
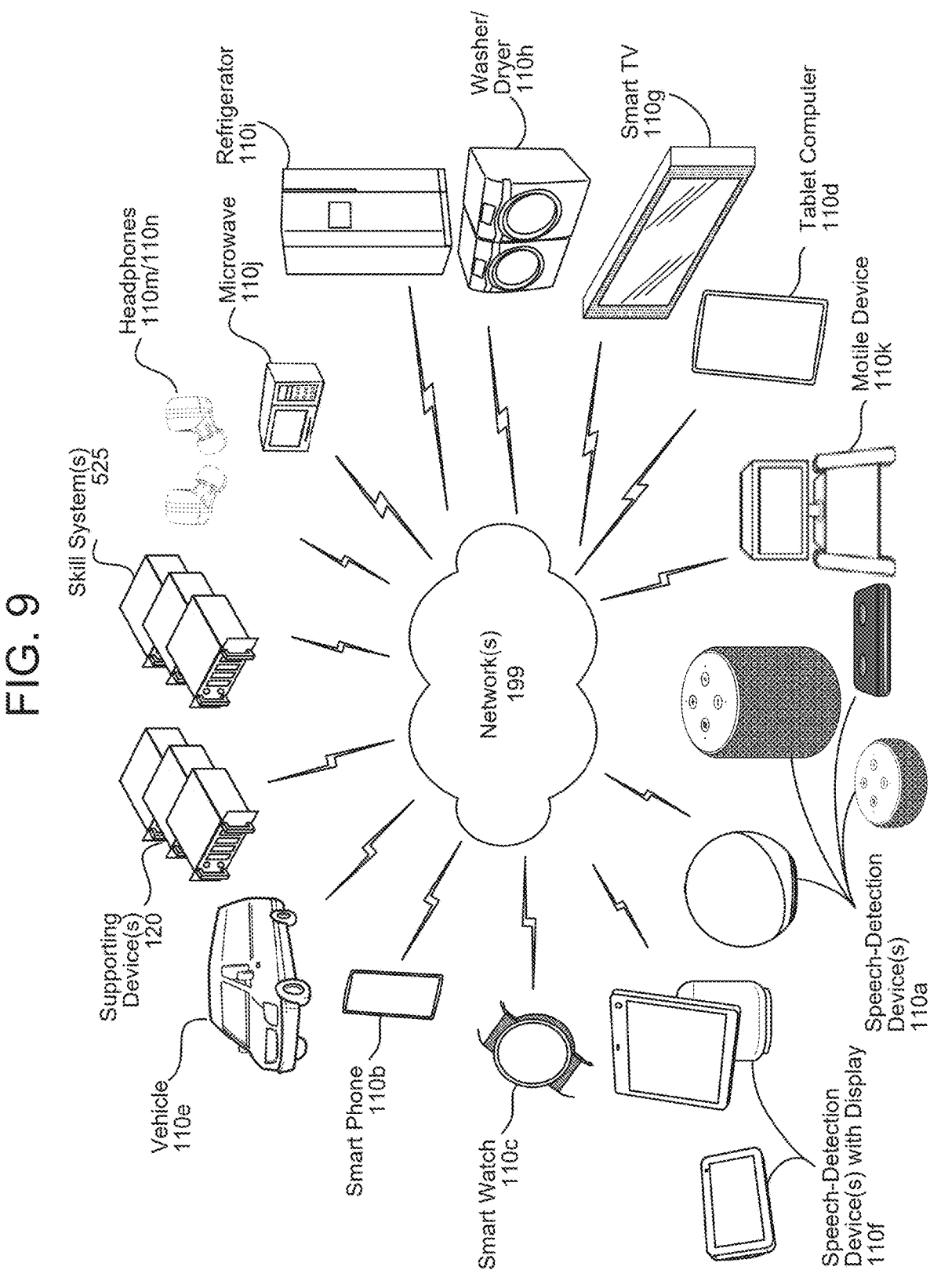
FIG. 9 illustrates an example of a computer network for use with the overall system, according to embodiments of the present disclosure.

As illustrated in FIG. 9, multiple devices (110a-110n, 120, 525) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), headphones 110m/110n, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the supporting device(s) 120, the skill system(s) 525, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 550, the NLU component 560, etc. of the supporting device(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first content presented to a first user during a first time period, the first content corresponding to a domain;
determining a first number of users that received the first content during the first time period;
determining, based on the first number of users, a first personalization metric representing a level of personalization with respect to the first content, the domain and the first user during the first time period;
storing, in a storage component, the first personalization metric and a user identifier for the first user;

receiving, from a first device associated with the first user, first input data corresponding to a first natural language input;
determining, using the first input data, that the first natural language input is related to personalized content information for the first user;
in response to the first natural language input, receiving, from the storage component, the first personalization metric associated with the user identifier;
sending, to the first device, first output data including a representation of the first personalization metric in response to the first natural language input;
receiving, from the first device, second input data related to the first personalization metric;
based on the first personalization metric and the second input data, determining second content corresponding to the domain to be presented to the first user; and
sending, to the first device, second output data corresponding to the second content.

2. The computer-implemented method of claim 1, further comprising:
after sending the second output data, receiving second input data from the first user indicating one or more preferences for the domain;
after receiving the second input data, receiving third output data representing second content presented to the first user during a second time period occurring after the first time period, the second content corresponding to the domain;
determining a second number of users that received the second content during the second time period;
determining, based on the second number of users, a second personalization metric representing a level of personalization with respect to the second content, the domain and the first user;
determining, based on a comparison of the first personalization metric and the second personalization metric, that the second content is a personalized output for the first user;
determining fourth output data requesting user feedback with respect to receipt of the second content; and
sending the fourth output data to the first device.

3. The computer-implemented method of claim 1, further comprising:
processing the first output data to determine a first category associated with the first content;
determining a second number of users that received content associated with the first category during the first time period;
determining, based on the second number of users, a second personalization metric representing a level of personalization with respect to the first category, the domain and the first user;
receiving a third personalization metric corresponding to the first user receiving content associated with a second category;
determining, based on a comparison of the second personalization metric and the third personalization metric, that the first user is receiving non-personalized outputs for the first category;
determining third output data representing second content associated with the first category; and
sending the third output data to the first device.

4. The computer-implemented method of claim 1, further comprising:
receiving third output data representing a first plurality of natural language outputs presented to users during a second time period, wherein the first plurality of natural language outputs are presented as synthesized speech;

receiving fourth output data representing a second plurality of natural language outputs presented to users during the second time period, wherein the second plurality of natural language outputs are displayed;

determining, using the first plurality of natural language outputs, a second personalization metric corresponding to synthesized speech outputs;

determining, using the second plurality of natural language outputs, a third personalization metric corresponding to displayed outputs;

determining, based on a comparison of the second personalization metric and the third personalization metric, that outputs presented as synthesized speech are personalized outputs;

receiving fifth output data representing a natural language output to be presented to a second user;

based at least in part on determining that outputs presented as synthesized speech are personalized outputs, determining, using the fifth output data, output audio data representing synthesized speech; and sending the output audio data to a second device associated with the second user.

5. A computer-implemented method comprising:

determining first content presented using a first user device during a first time period, the first user device associated with a first user profile;

determining a first number of user devices that received the first content during the first time period;

determining, based on the first number of user devices, a first personalization metric representing that the first content is a non-personalized output for the first user profile;

determining, based on the first personalization metric and the user feedback data, second content to be presented using the first user device;

determining first output data corresponding to the second content;

sending the first output data to the first user device; and based at least in part on the user feedback data and determining that the first content is a non-personalized output for the first user profile, sending second output data to the first user device, the second output data representing a prompt to configure preference settings for content.

6. The computer-implemented method of claim 5, further comprising:

determining that the user feedback data indicates that a user of the first user device wants to receive personalized output events for a domain; and based at least in part on determining that the first content is a non-personalized output for the first user profile and the user feedback data, determining the second content based at least in part on the first user profile.

7. The computer-implemented method of claim 5, further comprising:

determining that the user feedback data indicates that a user of the first user device wants to receive non-personalized outputs; and based at least in part on the user feedback data, determining the second content to include content presented to a second number of users.

8. The computer-implemented method of claim 5, further comprising:

determining a first category associated with the first content;

determining a second number of user devices that received content associated with the first category during the first time period;

determining, based on the second number of user devices, a second personalization metric for the first user profile, the second personalization metric representing a level of personalization with respect to the first category;

determining a second category associated with second content presented to the first user device during the first time period;

determining a third number of user devices that received content associated with the second category during the first time period;

determining, based on the third number of user devices, a third personalization metric for the first user profile, the third personalization metric representing a level of personalization with respect to the second category;

determining, based at least in part on the second personalization metric and the third personalization metric, that the first user profile is receiving non-personalized outputs for the first category; and determining the second content associated with the first category.

9. The computer-implemented method of claim 5, further comprising:

receiving a first plurality of natural language outputs presented to a first group of user devices during a second time period, wherein the first plurality of natural language outputs are presented as synthesized speech;

receiving a second plurality of natural language outputs presented to a second group of user devices during the second time period, wherein the second plurality of natural language outputs are displayed;

determining, using the first plurality of natural language outputs, a second personalization metric corresponding to synthesized speech outputs;

determining, using the second plurality of natural language outputs, a third personalization metric corresponding to displayed outputs;

determining, based on a comparison of the second personalization metric and the third personalization metric, that outputs presented as synthesized speech are personalized output events; and presenting the first output data as synthesized speech.

10. The computer-implemented method of claim 5, further comprising:

generating a first hash representation of the first content;

receiving, from a data storage, a plurality of hash representations corresponding to the first content, wherein the plurality of hash representations includes a second hash representation that is generated based on the first content being presented to a second user device during the first time period; and determining, based on the plurality of hash representations, the first number of user devices that received the first content during the first time period.

11. The computer-implemented method of claim 5, further comprising:

receiving data corresponding to third content presented to the first user device, the data including an indicator representing that a component received a profile identifier for a first user of the first user device, the indicator further representing that the component used the first user profile to determine the third content;

determining, based at least in part on the indicator, a second personalization metric for the first user profile, the second personalization metric representing that the third content is a personalized output for the first user profile;

receiving, from the first user device and after the third content is presented, a natural language input requesting personalization information for the third content;

determining third output data including a representation of the second personalization metric; and sending, to the first user device, the third output data in response to the natural language input.

12. A system comprising:

at least one processor; and at least one memory including instructions that, when executed by the at least one processor, cause the system to:

determine first content presented using a first user device during a first time period, the first user device associated with a first user profile;

determine a first number of user devices that received the first content during the first time period;

determine, based on the first number of user devices, a first personalization metric representing that the first content is a non-personalized output for the first user profile;

receive user feedback data related to receipt of personalized output events at the first user device;

determine, based on the first personalization metric and the user feedback data, second content to be presented using the first user device;

determine first output data corresponding to the second content;

send the first output data to the first user device; and based at least in part on the user feedback data and the first content being a non-personalized output for the first user profile, send second output data to the first user device, the second output data representing a prompt to configure preference settings for content.

13. The system of claim 12, wherein the at least one memory includes further instructions that, when executed by the at least one processor, further cause the system to:

determine that the user feedback data indicates that a user of the first user device wants to receive personalized output events for a first category; and based at least in part on determining that the first content is a non-personalized output for the first user profile and the user feedback data, determine the second content based at least in part on the first user profile.

14. The system of claim 12, wherein the at least one memory includes further instructions that, when executed by the at least one processor, further cause the system to:

determine that the user feedback data indicates that a user of the first user device wants to receive non-personalized outputs; and based at least in part on the user feedback data, determine the second content presented to a second number of users.

15. The system of claim 12, wherein the at least one memory includes further instructions that, when executed by the at least one processor, further cause the system to:

determine a first category associated with the first content;

determine a second number of user devices that received content associated with the first category during the first time period;

determine, based on the second number of user devices, a second personalization metric for the first user profile, the second personalization metric representing a level of personalization with respect to the first category;

determine a second category associated with second content presented to the first user device during the first time period;

determine a third number of user devices that received content associated with the second category during the first time period;

determine, based on the third number of user devices, a third personalization metric for the first user profile, the third personalization metric representing a level of personalization with respect to the second category;

determine, based at least in part on the second personalization metric and the third personalization metric, that the first user profile is receiving non-personalized outputs for the first category; and determine the second content associated with the first category.

16. The system of claim 12, wherein the at least one memory includes further instructions that, when executed by the at least one processor, further cause the system to:

receive a first plurality of natural language outputs presented to a first group of user devices during a second time period, wherein the first plurality of natural language outputs are presented as synthesized speech;

receive a second plurality of natural language outputs presented to a second group of user devices during the second time period, wherein the second plurality of natural language outputs are displayed;

determine, using the first plurality of natural language outputs, a second personalization metric corresponding to synthesized speech outputs;

determine, using the second plurality of natural language outputs, a third personalization metric corresponding to displayed outputs;

determine, based on a comparison of the second personalization metric and the third personalization metric, that outputs presented as synthesized speech are personalized output events; and present the first output data as synthesized speech.

17. The system of claim 12, wherein the at least one memory includes further instructions that, when executed by the at least one processor, further cause the system to:

generate a first hash representation of the first content;

receive, from a data storage, a plurality of hash representations corresponding to the first content, wherein the plurality of hash representations includes a second hash representation that is generated based on the first content being presented to a second user device during the first time period; and determine, based on the plurality of hash representations, the first number of user devices that received the first content during the first time period.

18. The system of claim 12, wherein the at least one memory includes further instructions that, when executed by the at least one processor, further cause the system to:

receive data corresponding to third content presented to the first user device, the data including an indicator representing that a component received a profile identifier for a first user of the first user device, the indicator further representing that the component used the first user profile to determine the third content;

determine, based at least in part on the indicator, a second personalization metric for the first user profile, the second personalization metric representing that the third content is a personalized output for the first user profile;

receive, from the first user device and after the third content is presented, a natural language input requesting personalization information for the third content;
determine third output data including a representation of the second personalization metric; and
send, to the first user device, the third output data in response to the natural language input.

\* \* \* \* \*